United States Patent

Parkinson et al.

[11] Patent Number: 6,052,647
[45] Date of Patent: Apr. 18, 2000

[54] METHOD AND SYSTEM FOR AUTOMATIC CONTROL OF VEHICLES BASED ON CARRIER PHASE DIFFERENTIAL GPS

[75] Inventors: Bradford W. Parkinson, Los Altos; Michael L. O'Connor, Jamul; Gabriel H. Elkaim, Castro Valley, all of Calif.; Thomas Bell, Reston, Va.

[73] Assignee: Stanford University, Stanford, Calif.

[21] Appl. No.: 08/879,628

[22] Filed: Jun. 20, 1997

[51] Int. Cl.[7] .................................................. G01S 3/02
[52] U.S. Cl. .......................... 701/215; 701/41; 701/50; 342/357
[58] Field of Search ................................. 701/215, 213, 701/205, 210, 24, 26, 41, 50; 342/357, 457; 180/168, 408

[56] References Cited

U.S. PATENT DOCUMENTS

| | | | |
|---|---|---|---|
| 4,384,293 | 5/1983 | Deem et al. | 342/352 |
| 5,101,356 | 3/1992 | Timothy et al. | 701/213 |
| 5,373,911 | 12/1994 | Yasui | 180/168 |
| 5,430,654 | 7/1995 | Kyrtsos et al. | 701/215 |
| 5,528,888 | 6/1996 | Miyamoto et al. | 701/50 |
| 5,548,293 | 8/1996 | Cohen | 342/357 |
| 5,572,218 | 11/1996 | Cohen et al. | 342/357 |
| 5,583,513 | 12/1996 | Cohen | 342/357 |
| 5,612,864 | 3/1997 | Henderson | 700/59 |
| 5,631,658 | 5/1997 | Gudat et al. | 342/547 |
| 5,646,844 | 7/1997 | Gudat et al. | 701/208 |
| 5,666,792 | 9/1997 | Mullins | 56/10.2 A |
| 5,883,317 | 3/1999 | Chisholm et al. | 345/419 |

OTHER PUBLICATIONS

M. O'Connor, et al., Carrier Phase Differential GPS for Closed–Loop Control of Farm and Construction Vehicles, 43 Navigation 167–178 (Summer 1996).

G. Lachapelle, et al., GPS Systems Integration and Field Approaches in Precision Farming, 41 Navigation 323–335 (Fall 1994).

J. Pointon, et al., LANDNAV: A Highly Accurate Land Navigation System for Agricultural Applications, Proceedings of ION GPS–94, Salt LakeCity, UT, 1077–1080 (Sep. 1994).

K. Lawton, GPS Sytem in a Box, Farm Industry News 10 (Jul./Aug. 1995).

R.L. Clark, et al., A Comparison of Rapid GPS Techniques for Development of Topographic Maps for Precision Farming, Proceedings of ION GPS–96, Kansas City, MO, 495–504 (Sep. 1996).

R.J. Palmer, et al., Impact of Navigation on Farming, International Winter Meetings of the American Society of Agricultural Engineers, Chicago, IL (Dec. 1988).

B.S. Pervan, et al., Integrity Monitoring for Precision Approach Using Kinematic GPS and a Ground–Based Pseudolite, 41 Navigation 159–174 (Summer 1994).

C.E. Cohen, et al., Real–Time Flight Testing Using Integrity Beacons for GPS Category III Precision Landing, 41 Navigation 145–157 (Summer 1994).

(List continued on next page.)

*Primary Examiner*—Tan Nguyen
*Attorney, Agent, or Firm*—Antonelli, Terry, Stout & Kraus, LLP

[57] ABSTRACT

Described is an automatic control system for land (and possible marine) vehicles based on carrier phase differential GPS (CPGPS). The system relies on CPGPS to determine vehicle position and attitude very precisely (position to within 1 cm and attitude to within 0.1°). A system incorporates a technique to calculate and compensate for antenna motion due to vehicle roll and pitch. One aspect of the system utilizes an intelligent vehicle controller that recognizes and adapts to changing conditions, such as vehicle speed, implements towed by the vehicle, soil conditions, and disturbance level. The system provides the capability to control the vehicle on various paths, including straight lines and arbitrary curves. Also described is a technique for initialization and vehicle control using only a single pseudolite.

27 Claims, 19 Drawing Sheets

OTHER PUBLICATIONS

C.E. Cohen, et al., Real–Time Cycle Ambiguity Resolution Using a Pseudolite for Precision Landing of Aircraft with GPS, Second International Symposium on Differential Satellite Navigation Systems, Amsterdam, The Netherlands (Mar. 1993).

B. Pervan, Navigation Integrity for Aircraft Precision Approach Using the Global Positioning System, Ph.D. Dissertation, Stanford University, SUDAAR 677 (Mar. 1996).

A. Gelb, Applied Optimal Estimation, Analytic Sciences Corp., 180–203 (1989).

J.–N. Juang, *Applied System Identification*, 175–182 (Prenctice Hall 1994).

M. O'Connor, et al., Kinematic GPS for Closed–Loop Control of Farm and Construction Vehicles, Proceedings of ION GPS–95, Palm Springs, CA (Sep. 1995).

G. Elkaim, et al., System Identification of a Farm Vehicle Using Carrier–Phase Differential GPS, Proceedings of ION GPS–96, Kansas City, MO, 485–494 (1996).

M. O'Connor, et al., Real–Time CDGPS Initialization for Land Vehicles Using a Single Pseudolite, Procedings of ION National Technical Meeting, Santa Monica, CA, 717–724 (Jan. 14–16, 1997).

M. O'Connor, et al., Automatic Control of Farm Vehicles Using GPS, Proceedings of the Third International Conference on Preceision Agriculture, Minneapolis, MN, 767–777 (Jun. 23–26, 1996).

C. Bartone, Advanced Pseudolite for Dual–Use Precision Approach Applications, Proceedings of ION GPS–96, Kansas City, MO, 95–105 (Sep. 1996).

METHOD AND SYSTEM FOR AUTOMATIC CONTROL OF VEHICLES BASED ON CARRIER PHASE DIFFERENTIAL GPS

FIELD OF THE INVENTION

The present invention generally relates to automatically locating, positioning, and controlling vehicles, and particularly to a method and system for automatically controlling surface vehicles (for example, farm tractors) based on carrier phase differential Global Positioning System (GPS) information.

BACKGROUND OF THE INVENTION

Some existing systems for ground positioning are based on GPS. GPS includes twenty-four active satellites orbiting the earth that were put in place by the United States Department of Defense. Each satellite continuously broadcasts a signal that contains an L-band carrier component (L1), which is transmitted at a frequency of 1.575 GHz. The L1 carrier component is modulated by a coarse acquisition (C/A) pseudo random (PRN) code component and a data component. The PRN code provides timing information that allows determination of when the GPS signal was broadcast. The data component provides certain GPS information, such as the satellite's orbital position.

Existing methods for position determination include Conventional GPS, in which a receiver makes ranging measurements between an antenna coupled to the receiver and each of at least four GPS satellites in view. The receiver makes these measurements from the timing information and the satellite orbital position information obtained from received GPS signal information. By receiving four different GPS signals, the receiver can make position determinations. However, the accuracy of Conventional GPS is only to within tens of meters of actual position. This accuracy is generally not sufficient for controlling land vehicles.

A more accurate use of GPS is Ordinary Differential GPS, in which position determination is made using similar ranging measurements to those made with Conventional GPS. However, a ground reference receiver at a precisely known location is utilized to increase accuracy. The method depends on the assumption that satellite ranging errors can be expected to affect position determinations made by the user's receiver in the same way as they will the position determinations for the reference receiver. Since the precise location of the reference receiver is known, its calculated position determination can be compared to the actual position to determine the ranging error, which is then used to compute suitable corrections for the user's receiver. The user then applies the corrections to the user's location determinations.

Additional corrections using Ordinary Differential GPS can be made using a ground-based pseudo satellite ("pseudolite") and an unassigned PRN code, which allows the user's receiver to make a redundant fifth ranging determination for greater accuracy. These methods allow accuracy of position determination to several meters.

Meter-level code-differential GPS techniques are currently used for mapping and yield monitoring (see for example, G. Lachapelle, et al., GPS Systems Integration and Field Approaches in Precision Farming, 41 Navigation 323–335 (Fall 1994); J. Pointon and K. Babu, LANDNAV: A Highly Accurate Land Navigation System for Agricultural Applications, Proceedings of ION GPS-94, Salt Lake City, Utah, 1077–1080 (September, 1994); Kurt Lawton, GPS System in a Box, Farm Industry News 10 (July/August 1995)), and the use of GPS in relation to field topographic mapping has been explored (see, for example, R. L. Clark and R. Lee, A Comparison of Rapid GPS Techniques for Development of Topographic Maps for Precision Farming, Proceedings of ION GPS-96, Kansas City, Mo., 495–504 (September 1996)). A low-cost, real-time precision navigation system has numerous potential applications in land vehicles such as data collection, driver guidance, and automatic control.

One accurate technique for position determination known in the art is Carrier Phase Differential GPS (CDGPS). CDGPS utilizes the 1.575 GHz carrier component of the GPS signal and superimposition of the PRN code and data component. The method typically involves generating position determinations based on the measured phase differences between two different antennas for the carrier component of a GPS signal. This technique requires initial determination of how many integer wavelengths of the carrier component exist between the two antennas at a particular point in time, a method referred to as integer ambiguity resolution.

CDGPS offers the potential for low-cost precision navigation that does not require specific external cues for successful operation. Robot vehicles using this technology may someday be used to clear minefields, clean up toxic waste, apply hazardous pesticides, tirelessly harvest crops, and transport disabled people. The first widespread use of CDGPS in land vehicles will most likely occur in farm equipment. Fields typically have good sky visibility, making them highly suitable for GPS. Also, the cost versus production rewards to be gained through precision farming are significant (see, for example, R. J. Palmer and S. K. Matheson, Impact of Navigation on Farming, International Winter Meeting of the American Society of Agricultural Engineers, Chicago, Ill. (December 1988)).

In determining position using CDGPS, integer search techniques are typically used to measure residuals to find the correct integers, a technique prone to false solutions. Such a loss of system integrity could be costly or even dangerous in many high accuracy GPS applications. A successful method that is known in the art is use of a motion-based method that has been applied to static surveying applications. This approach involves taking a number of phase measurements while the user's antenna and a reference antenna are stationary. These phase measurements are typically made over a period from 15 minutes to 90 minutes. The phase measurements made during the slowly changing geometry of the GPS satellites reveal the integer ambiguities.

A motion-based method used for aircraft involves use of four antennas—one on the tail, one on the fuselage, and one on each wing tip. Using the fuselage antenna as a reference antenna, integer ambiguities may be resolved in seconds by rotating the aircraft and taking several phase measurements. However, because the reference antenna and the other antennas are fixed to the aircraft, this method, while useful for precise attitude determinations for the aircraft, is not useful for precise position determination. Moreover, it is not believed to have been adapted for use in connection with automatically controlling movement of a land vehicle.

Another currently available initialization technique, which was created for precision aircraft landing, reduces the fundamental limitations of the above methods but requires use of two or more GPS pseudo-satellite transmitters for CDGPS initialization. By providing additional ranging signals, the use of pseudolites improves GPS system availability and integrity (see, for example, B. S. Pervan, et al., Integrity Monitoring for Precision Approach Using Kinematic GPS and a Ground-Based Pseudolite, 41 Navigation 159–174 (Summer 1994)). This is especially important when obstructions or excessive vehicle attitude motion may result in the loss of GPS satellite signals.

A minimum of two pseudolites are needed for the aircraft landing system, a system referred to as the Integrity Beacon Landing System (IBLS) (see, for example, C. E. Cohen, et al., Real-Time Flight Testing Using Integrity Beacons for GPS Category III Precision Landing, 41 Navigation 145–157 (Summer 1994)). For a straight trajectory, it can be shown that each pseudolite provides an accurate measurement of along-track and radial position, but no information about cross-track position (see, for example, C. E. Cohen, et al., Real-Time Cycle Ambiguity Resolution Using a Pseudolite for Precision Landing of Aircraft with GPS, Second International Symposium on Differential Satellite Navigation Systems, Amsterdam, The Netherlands (March 1993)). This problem is solved by placing two pseudolites on opposite sides of the approach path. These pseudolites complement each other to produce a highly accurate and robust three dimensional navigation solution.

A method for use with aircraft positioning determination involving use of one or more pseudolites is described by U.S. Pat. No. 5,572,218 issued to Clark Cohen et al., System and Method for Generating Precise Position Determinations. The system comprises a ground-based stationary reference GPS system and a mobile GPS system mounted on a moving vehicle. The stationary reference station includes a GPS reference receiver, an initialization pseudolite, a data link pseudolite, and a reference antenna.

The data link pseudolite generates and broadcasts a signal beam data link signal, which has at least a carrier component and a data component. The initialization pseudolite generates and broadcasts a low power signal bubble initialization signal, which has at least a carrier component. The reference antenna receives GPS signals broadcast by GPS satellites and provides them to the reference receiver. The reference receiver determines phase measurements at periodic measurement epochs for the carrier phase components of the GPS signals and may also conduct these measurements for the carrier component of the initialization signal. Data regarding these phase measurements is received by the data link pseudolite and then transmitted to the mobile system via the data component of the data link signal.

The mobile elements of this system comprise a GPS position receiver and two antennas. One antenna receives the same GPS signals as received by the reference antenna, both during and after an initialization period. The second antenna receives the initialization and data link signals form the two pseudolites during the initialization period and then continues to receive only the data link signal after that period. Each of the GPS signals received by the first antenna and the reference antenna has an integer ambiguity associated with these two antennas. The initialization period is used to resolve these integer ambiguities so that the mobile GPS position receiver can generate precise position determinations for the first antenna using CDGPS.

During initialization, the GPS position receiver receives the GPS signals and the initialization and data link signals from the two antennas. The vehicle moves about during this period within the signal bubble, and a large angular change in geometry results between the moving vehicle and the initialization pseudolite. The mobile GPS position receiver makes and records phase measurements for the GPS signals and the initialization signal over the large change in geometry. These phase measurements are made during the same epochs as those made by the GPS reference receiver over this same change in geometry. In addition, the mobile GPS receiver receives via the data link signal the phase measurements made by the GPS reference receiver and records them. From the recorded phase measurements of both receivers, the GPS position receiver can accurately compute initialization values representing resolutions of the integer ambiguities of the GPS signals. Thus, the large angular change in geometry reveals the integer ambiguities.

Once these initialization values have been computed, the initialization period is over and the moving vehicle will have left the signal bubble. The mobile GPS receiver can then compute precise positions for the first antenna at each measurement epoch to within centimeters of the exact location. This is done using the computed initialization values, the phase measurement for the GPS signals made by the mobile position receiver, and the phase measurements made by the GPS reference receiver provided to the GPS position receiver via the data link signal.

In determining positioning using CDGPS and a single pseudolite for a vehicle such as a land vehicle, a series of equations may be used and manipulated. The non-linear equation for a differential carrier phase measurement of pseudolite j at epoch k is (see B. Pervan, Navigation Integrity for Aircraft Precision Approach using the Global Positioning System):

$$\phi_{jk}=|p_j-x_k|+\tau_k+N_j+v_{jk}$$

where:
$\phi_{jk}$=Raw single difference carrier phase measurement
$p_j$=Position of pseudolite j
$x_k$=Vehicle antenna position
$\tau_k$=Clock bias
$N_j$=Cycle ambiguity for pseudolite j
$v_{jk}$=Measurement noise with standard deviation $\sigma_\phi$ This equation can be linearized about an estimate of vehicle position and combined with the satellite differential carrier phase equations. The basic linearized carrier phase measurement equations for m satellites and n pseudolites at epoch k can then be written as follows (see, for example, B. Pervan, Navigation Integrity for Aircraft Precision Approach using the Global Positioning System, Ph.D. Dissertation, Stanford University, SUDAAR 677 (March 1996)):

$$\delta\phi_{1k}=-e_{1k}T\delta x_k+\tau'_k+v_{1k}$$

$$\delta\phi_{ik}=-e_{ik}T\delta x_k+\tau'_k+N'_i+v_{ik},$$

i=2 . . . m $$\delta\phi_{jk}=-\hat{e}_{jk}T\delta x_k+\tau'_k+N'_j+v_{jk},$$

i=1 . . . n
where:
$e_{ik}$=Line-of-sight unit vector to satellite i
$\hat{e}_{jk}$=Estimated line-of-sight unit vector to pseudolite j
$\tau'_k$=Clock bias+cycle ambiguity for satellite 1
$N'_i$=Cycle ambiguity for satellite i–satellite 1

For a single epoch, there are more equations (m+n), than unknowns (m+n+3), so there is no explicit solution for this set of equations. If a wide range of integer cycle ambiguity candidates are substituted into these equations, the set producing the lowest mean-square residual is often (but not always) the correct integer solution.

As additional epochs of data are collected, the integer cycle ambiguities do not change. Each new epoch of data produces m+n more equations and only four more unknowns ($\delta x_k$ and $t'_k$). A sufficient geometry change is needed to resolve the integer ambiguities. For an aircraft on a straight flight path, four satellites and two pseudolites are needed to provide "geometric leverage" to resolve the ambiguities.

Experimental work regarding use CDGPS for control of a land vehicle (a golf cart) is described in Michael O'Connor, et al., Kinematic GPS for Closed-Loop Control of Farm and Construction Vehicles, ION GPS-95, Palm Springs, Calif. (September 1995). The system described in this article utilized a GPS receiver to produce carrier phase measurements for attitude determination and a separate receiver to determine vehicle position. An on-board computer performed attitude, position, and control signal computations. In addition to the vehicle, the system included a ground reference station consisting of a computer and a GPS receiver used to generate carrier phase measurements and code differential corrections. The data from the reference station was transmitted to the vehicle via a radio modem.

The results described in the above-referenced O'Connor article showed that more control effort was required, and accuracy was poorer than predicted by simulation. This was most likely due to an inexact disturbance model in the simulation. One likely cause of the disturbance noise was the roll motion of the vehicle (a golf cart). Although the roll angle of the vehicle was measured, the resulting motion of the two meter high positioning antenna relative to the wheel base was not corrected for by this system. Thus, the technique described in this article includes no control correction for such effects as vehicle roll due to ground disturbances. Failure to measure a vehicle's roll is a significant hindrance to effective control on non-smooth surfaces.

OBJECTS OF THE INVENTION

It is an object of the present invention to provide an automatic control system for vehicles based on Carrier Phase Differential GPS (CDGPS).

It is a further object of the present invention to use CDGPS for measurement and feedback of heading and heading rate.

It is a further object of the present invention to measure and compensate for GPS antenna motion due to vehicle roll and pitch.

It is a further object of the present invention to use a single pseudolite in a GPS control system for a land vehicle thereby avoiding the need for a relatively long "blind" satellite integer search for CDGPS position initialization.

It is a further object of the present invention to provide a state-space observer and integral controller based on a modified kinematic vehicle model.

SUMMARY OF THE INVENTION

The present invention meets these objectives by providing a system and method for real-time guidance and control of a vehicle that accounts for vehicle roll and pitch due to ground disturbance using CDGPS and a vehicle-located receiver. In addition, the present invention provides a method and system for use of a single ground-based transmitter, such as a pseudolite, for initialization.

According to one aspect of the invention, a system and method is provided for controlling a ground vehicle using Carrier-Phase Differential GPS. A plurality of vehicle GPS antennas are fixed to the vehicle at predetermined locations to receive GPS signals. GPS receivers coupled to the plurality of vehicle GPS antennas produce vehicle attitude measurements and vehicle carrier- and code-phase measurements. A ground reference station including at least one reference GPS antenna and a GPS receiver coupled thereto produces reference carrier phase measurements and reference code differential corrections. Information is provided to the vehicle along a wireless communication channel. A computer receives as input data the vehicle attitude measurements, the vehicle carrier- and code phase measurements, the reference carrier phase measurements and reference code differential corrections, and adjusts on the basis of the input data the state of the vehicle for maximum performance. The state of the vehicle may be heading, steer angle, steer rate, lateral deviation from a trajectory, and/or others. The computer outputs to a vehicle steering controller a control signal based on the calculated state adjustment. The vehicle steering control selectively changes the state of the vehicle on the basis of the control signal.

According to a feature of the invention, the computer determines vehicle roll, pitch and yaw angles on the basis of phase differences in the GPS signals received respectively at the vehicle GPS antennas and adjusts the control signal to account for errors based on variations in vehicle roll, pitch and yaw.

According to another feature of the invention, the vehicle includes a sensor, such as a potentiometer, to measure the steering angle of the vehicle and to provide this information to the controller in order to calculate the control signal.

According to still another feature of the invention, the system adaptively identifies system parameters and the controller is dynamically recalculated at successive measurement intervals. Thus, the system takes into account varying conditions such as vehicle velocity, relative displacement between the vehicle GPS antennas and the wheel base of the vehicle, soil conditions that contribute to vehicle wheel slippage, and other conditions.

According to another feature of the invention, the controller calculates the control signal on the basis of a dynamic system model utilizing fixed system parameters obtained experimentally. Alternatively, the system parameters are time-varying.

According to yet another feature of the invention, a hybrid controller is utilized. A first controller model is implemented for relatively coarse steering adjustments and a second controller model is implemented for relatively fine steering adjustment. The first controller may comprise, for example, a non-linear "bang—bang" controller. The second controller may be, for example, a Linear Quadratic Guassian-based design (LQG).

According to another aspect of the invention, the system initialization is accomplished using at least one GPS pseudolite by moving the vehicle around the GPS pseudolite to resolve integer ambiguities.

Additional objects, advantages, and novel features of the invention will be set forth in the following description and will become apparent to those skilled in the art upon reading this description or practicing the invention.

DETAILED DESCRIPTION

Reference will now be made in detail to various embodiments of the invention. It will be understood that these embodiments are merely illustrative of the features of the inventions. Many modifications and improvements of the specific embodiments described below will be apparent to those skilled in the art.

Figure 1:
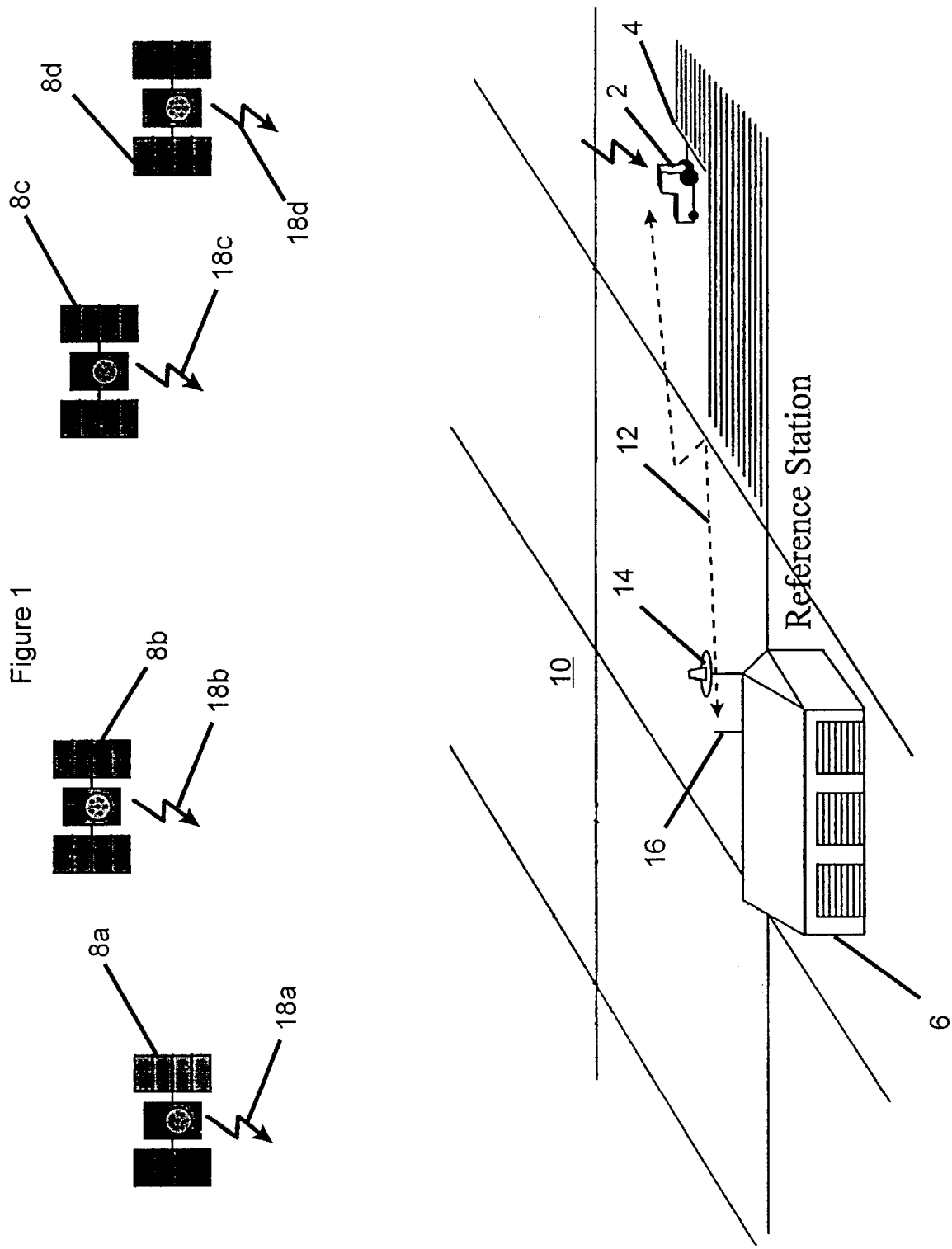
FIG. 1 is a general view of a GPS system which employs a reference station to control a ground vehicle in accordance with a first embodiment of the invention.

FIG. 1 generally shows a system according to a first embodiment of the present invention for control of a land vehicle using Carrier Phase Differential GPS (CDGPS). In this example, the land vehicle 2 is a farming tractor with an attached implement 4 used to plow a field 10. As described in greater detail below, the vehicle 2 operates automatically to travel a predefined path. A controller sends steering rate commands to minimize the lateral position error of the vehicle on the basis of GPS attitude and position information received directly from GPS satellites 8a–8d, information received from a stationary reference station (located in this example in barn 6) through a radio data link 12, wheel angle measurements, and possible other measurements, such as hitch load.

The stationary reference station includes a GPS antenna 14 which receives GPS signals 18a–18d respectively from the satellites 8a–8d. The GPS signals received by the reference station are processed to generate carrier phase measurement and RTCM code differential corrections. Data from the reference station is transmitted to the vehicle 2 using antenna 16.

Figure 2:
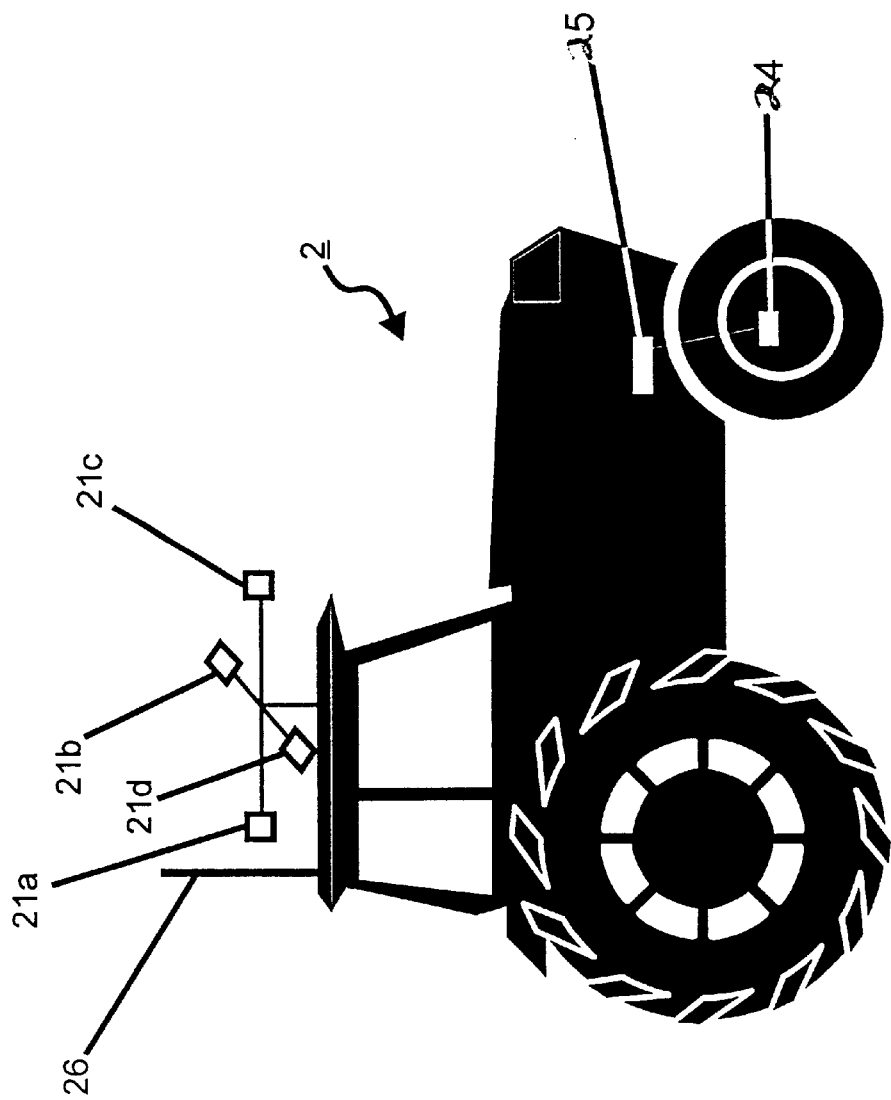
FIG. 2 is a perspective view of a land vehicle in accordance with an embodiment of the invention.

FIG. 2 illustrates in more detail a land vehicle 2 as generally shown in FIG. 1. In this example, the vehicle 2 is a tractor; however, it will be understood that the invention is not so limited, and may be used advantageously to control various ground vehicles. A plurality of GPS antennas (in this case, four antennas) 21a–21d are mounted on the top of the vehicle 2 along with an antenna 26 which communicates with the reference station. As described in greater detail below, a sensor 24 is used to measure front wheel angle. Steering is controlled using a steering unit 25. An internal processor or data acquisition board serves as a communications interface between a control computer (which may be on or off-board) and the steering unit 25. In this example, the internal processor also converts data obtained from the sensor 24 so it may be processed by control computer.

As known in the art, the GPS signals 18a–18d are L1 C/A code GPS signals which contain an L1 carrier component, a C/A PRN code, and a data component. The L1 carrier is a sinusoidal wave transmitted at a frequency of 1.575 GHz. The L1 carrier signal provides input to the receiver in the vehicle 4 and the receiver in the reference station to enable the controller to compute precise position determinations for the vehicle 4 using Carrier Phase Differential GPS. The PRN codes are unique signals generated by each of the GPS satellites 8a–8d which permit receivers to identify and separate each of the various signals received from the GPS satellites 8a–8d. The data component of the GPS signals 18a–18d are bit streams which indicate the orbital position of the broadcasting GPS satellite.

The invention utilizes the GPS signals 18a–18d to precisely determine both the attitude and position of the vehicle 2 using CDGPS. In a preferred embodiment, an adapted version of the IBLS positioning system invented by Clark Cohen and associates is used to determine the position and attitude of the vehicle 2. While referred to generally below, the details of this technique are known in the art. In this regard, see U.S. Pat. No. 5,572,218, the disclosure of which is incorporated by reference herein. Moreover, in contrast to prior art GPS controllers for land vehicles referred to above, it is a feature of the present invention that multiple antennas are mounted on the vehicle 2 so that the pitch, roll and yaw of the vehicle 2 as it travels over non-planar terrain may be taken into account in calculating the amount of steering correction necessary to maintain the vehicle along a desired track. In the preferred embodiment, the precise attitude of the vehicle is calculated for this purpose using a known technique invented by Clark Cohen and described in U.S. Pat. No. 5,48,293, the disclosure of which is also incorporated by reference.

As generally demonstrated by Clark Cohen, attitude determination of a moving vehicle may be realized using four antennas. Each antenna receives a plurality of GPS signals, each including a carrier component. For each of the carrier components of the received GPS signals there is an integer ambiguity associated with the first and fourth antenna, the second and fourth antenna, and the third and fourth antenna. A GPS attitude receiver measures the phase values for the carrier components of the GPS signals received from each of the antennas at a plurality of measurement epochs after initialization. In response to the phase values measured at the measurement epochs during the initialization period, the GPS attitude receiver computes integer ambiguities. Then, in response to the computed integer ambiguity resolution values and the phase value measured at the measurement epoch after the initialization period, it computes values defining the attitude of the moving vehicle at the measurement epoch after the initialization period.

In this way, it is possible to precisely determine the attitude of the land vehicle with respect to the terminus of the GPS antennas. By knowing the position of the antennas relative to the wheel base, it is then possible to determine the pitch, roll and yaw angle of the vehicle at given times. These values may be used to correct the position error which would otherwise result from side-slip on inclined terrain or from an incorrect position estimate that would result from failing to take into account the movement of the antenna above the point on the tractor being controlled. In other words, by not accounting for the "lever arm" of the positioning antenna, significant positioning errors are introduced when the vehicle is moving along sloped terrain.

Figure 3:
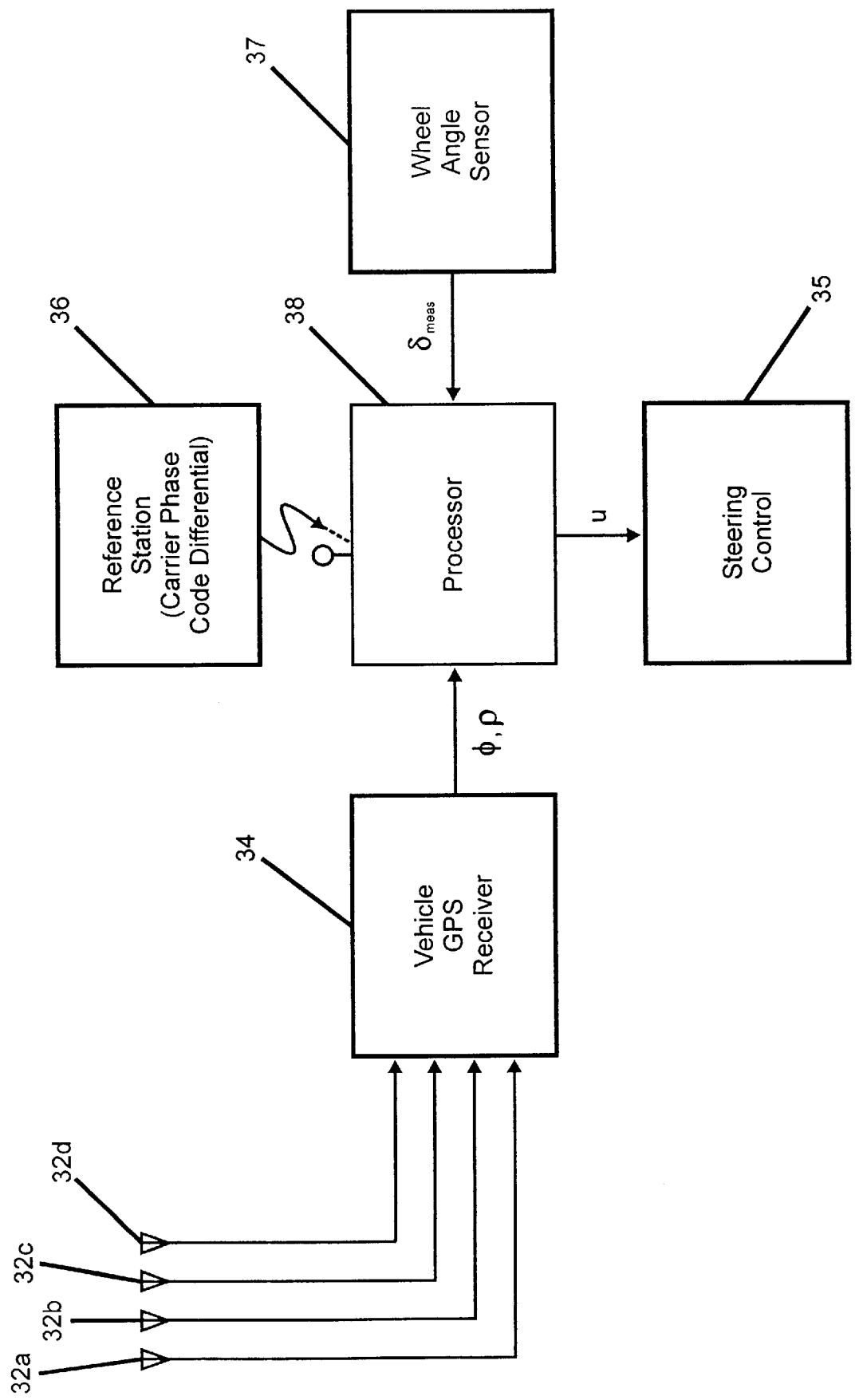
FIG. 3 is a general block diagram of the components of an embodiment of the present invention in which a vehicle is controlled on the basis of input received from CDGPS and other sensors.

FIG. 3 is a block diagram illustrating the components of a preferred embodiment of the invention in which a vehicle is controlled on the basis of input received from CDGPS and other sensors. In this example, four GPS antennas 32a–32d are coupled to a vehicle GPS receiver 34. The GPS antennas 32a–32d receive the above noted GPS signals which are input to the vehicle GPS receiver 34. The vehicle GPS receiver utilizes these signals to make initial determinations of vehicle attitude as well as code- and carrier phase measurements Φ,ρ which are utilized to calculate vehicle position according to known techniques. These measurements are provided to a processor 38 which typically comprises an on-board computer. Of course, it will be appreciated that the system could be adapted so that these measurements are relayed to a remote off-board processor that calculates position adjustments which, in turn, are relayed back to the vehicle.

In this embodiment, the processor 38 is coupled to a wheel angle sensor 37, a reference station 36 and a vehicle steering controller 35. The wheel angle sensor 37 provides a measurement of actual wheel angle $\delta_{meas}$. The reference station 37 generates carrier phase measurements and RTCM code differential corrections which are provided to the processor 38 via a radio interface. The processor collects the data from the vehicle GPS receiver 34, the reference station 36, and the wheel angle sensor 37, and uses this data to generate a control signal u which is used to maintain the vehicle on a desired path. The control signal u is provided to a steering control system which converts the control signal to a signal used to automatically adjust the steering of the vehicle.

In determining the control signal u, it is a feature of the invention that the processor 38 takes into account an error which would otherwise be introduced in the calculations as a result of variations between the relative position of GPS antennas and the wheel used to adjust the position of the vehicle. This is accomplished by calculating roll, pitch and yaw angles at successive periods and adjusting measured position and heading in the surface plane (x-y) model. The processor 38 also takes into account other varying conditions such as vehicle forward velocity, soil conditions (which may affect the movement of the vehicle's wheels or of a towed implement), actuator speed, wheel base length, and others.

In accordance with another feature of the invention, the processor 38 may be used for adaptive control to identify such varying parameters on-line as the vehicle is operated so as to be self-adjusting.

The following sections describe various implementations of the general features of the invention referred to above. It should be understood that these are merely illustrative of the general features of the invention and many adaptations will be apparent to those skilled in the art.

Vehicle Modeling and System Identification

For most day-to-day tasks, the motion of ground vehicles involve complex phenomena which are difficult, if not impossible to physically model. However, by constructing models and estimating unknown parameters, it is possible to map input/output behavior to an extent sufficient for control of many tasks.

Figure 4:
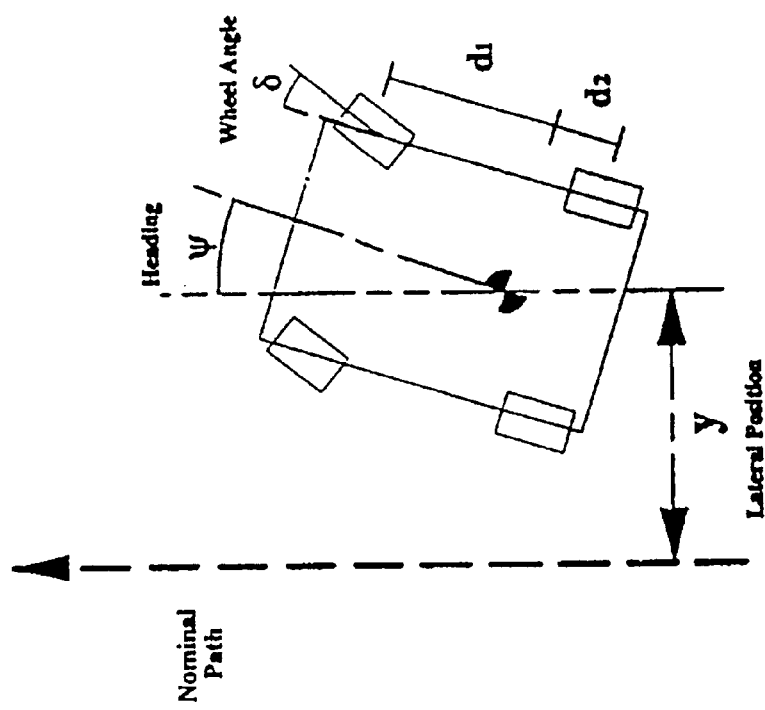
FIG. 4 is a diagram of the movement of a vehicle across a planar surface.

FIG. 4 illustrates the movement of a vehicle with a forward velocity V across a planar surface. In the drawing:

$d_1$ is the distance from the front axle to the "center" of the vehicle;

$d_2$ is the distance from the rear axle to the center of the vehicle;

y is the lateral deviation from the nominal path;

Ψ is the heading deviation from the nominal path; and

δ is the front wheel angle of the vehicle.

These parameters (and others) may be utilized to determine the steering angle rate u at a given time so as to maintain the vehicle along a desired path. As described in reference to the examples set forth below, it is possible to measure these parameters directly or to obtain estimates of these parameters to a degree of accuracy sufficient to maintain a vehicle along a predetermined path.

A simple kinematic model for a vehicle which is based on simple geometry (rather than inertias and forces) may be described by the following linearized equations of motion:

$$\dot{y} = V_{x0}\psi + \frac{V_{x0}d_1}{(d_1+d_2)}\delta$$

$$\dot{\psi} = \frac{V_{x0}}{(d_1+d_2)}\delta$$

$$\dot{\delta} = u$$

where $V_{x0}$ is the forward velocity of the vehicle. Such a model is described in the above-referenced article to O'Connor et al., "Kinematics GPS for Closed-Loop Control of Farm and Construction Vehicles," where experimental data was taken during a closed loop trial and run through an Extended Kalman Filter, a computational algorithm that it is known in the art. See Gelb, A., Applied Optimal Estimation, Analytic Sciences Corp. 1989. This algorithm is used generally to calculate the minimum variance estimate of a state as a function of time and accumulated data for non-linear systems.

While this model has been used successfully for closed loop control of a golf cart, it assumes both a constant velocity along the nominal path, as well as no wheel slip. Unfortunately, many ground vehicles, such as agricultural farm vehicles, must be able to operate over various types of terrain and with a variety of implements. Thus, in most operating environments, these assumptions are not valid.

The preferred embodiment of the present invention utilizes a dynamic model which takes into account several varying conditions. Such a model may be represented by:

$$\begin{bmatrix} \dot{y} \\ \dot{\psi} \\ \dot{\Omega} \\ \dot{\delta} \\ \dot{\omega} \end{bmatrix} = \begin{bmatrix} 0 & p_3 & p_4 & 0 & 0 \\ 0 & 0 & 1 & 0 & 0 \\ 0 & 0 & p_1 & p_2 & 0 \\ 0 & 0 & 0 & 0 & 1 \\ 0 & 0 & 0 & 0 & -p_5 \end{bmatrix} \begin{bmatrix} y \\ \psi \\ \Omega \\ \delta \\ \omega \end{bmatrix} + \begin{bmatrix} 0 \\ 0 \\ 0 \\ 0 \\ p_5 \end{bmatrix} u$$

where, y, ψ, and δ have the values given above in reference to FIG. 4, Ω is the heading rate, ω is the front wheel angle rate, and the parameter vector p:

$$\vec{p} \equiv \begin{bmatrix} p_1 \\ p_2 \\ p_3 \\ p_4 \\ p_5 \end{bmatrix}$$

is based on the vehicle forward velocity, soil conditions, actuator speed, wheel base length, and other varying conditions.

For simplicity, this model may be rewritten as:

$$\begin{bmatrix} \dot{y} \\ \dot{\psi} \\ \dot{\Omega} \\ \dot{\delta} \\ \dot{\omega} \end{bmatrix} = A(\vec{p}) \begin{bmatrix} y \\ \psi \\ \Omega \\ \delta \\ \omega \end{bmatrix} + B(\vec{p}) u$$

where $$A(\vec{p}) = \begin{bmatrix} 0 & p_3 & p_4 & 0 & 0 \\ 0 & 0 & 1 & 0 & 0 \\ 0 & 0 & p_1 & p_2 & 0 \\ 0 & 0 & 0 & 0 & 1 \\ 0 & 0 & 0 & 0 & -p_5 \end{bmatrix}$$

and $$B(\vec{p}) = \begin{bmatrix} 0 \\ 0 \\ 0 \\ 0 \\ p_5 \end{bmatrix}$$

Once a suitable dynamic model of a the ground vehicle is determined, it is necessary to identify the parameters of the dynamic model. Based on these parameters, a controller may be constructed to generate a control signal as described generally in reference to FIG. 3.

It will be appreciated that just as different dynamic models may be utilized, various alternatives are available for identifying system parameters. Further, many different hardware embodiments may be utilized. Merely to facilitate understanding of the present invention, some possible variations are now discussed in reference to the following examples.

Examples

Figure 5:
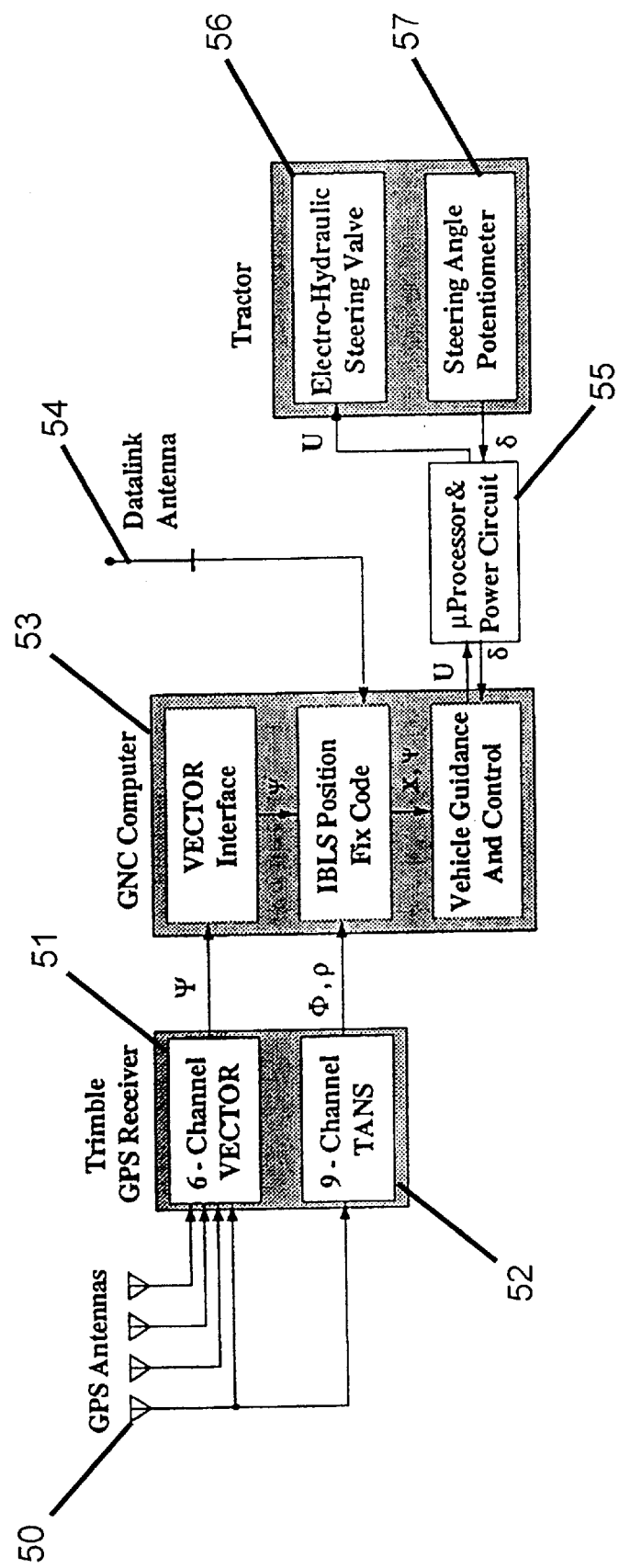
FIG. 5 is a block diagram showing the hardware architecture of a first-example of the invention.
Figure 6:
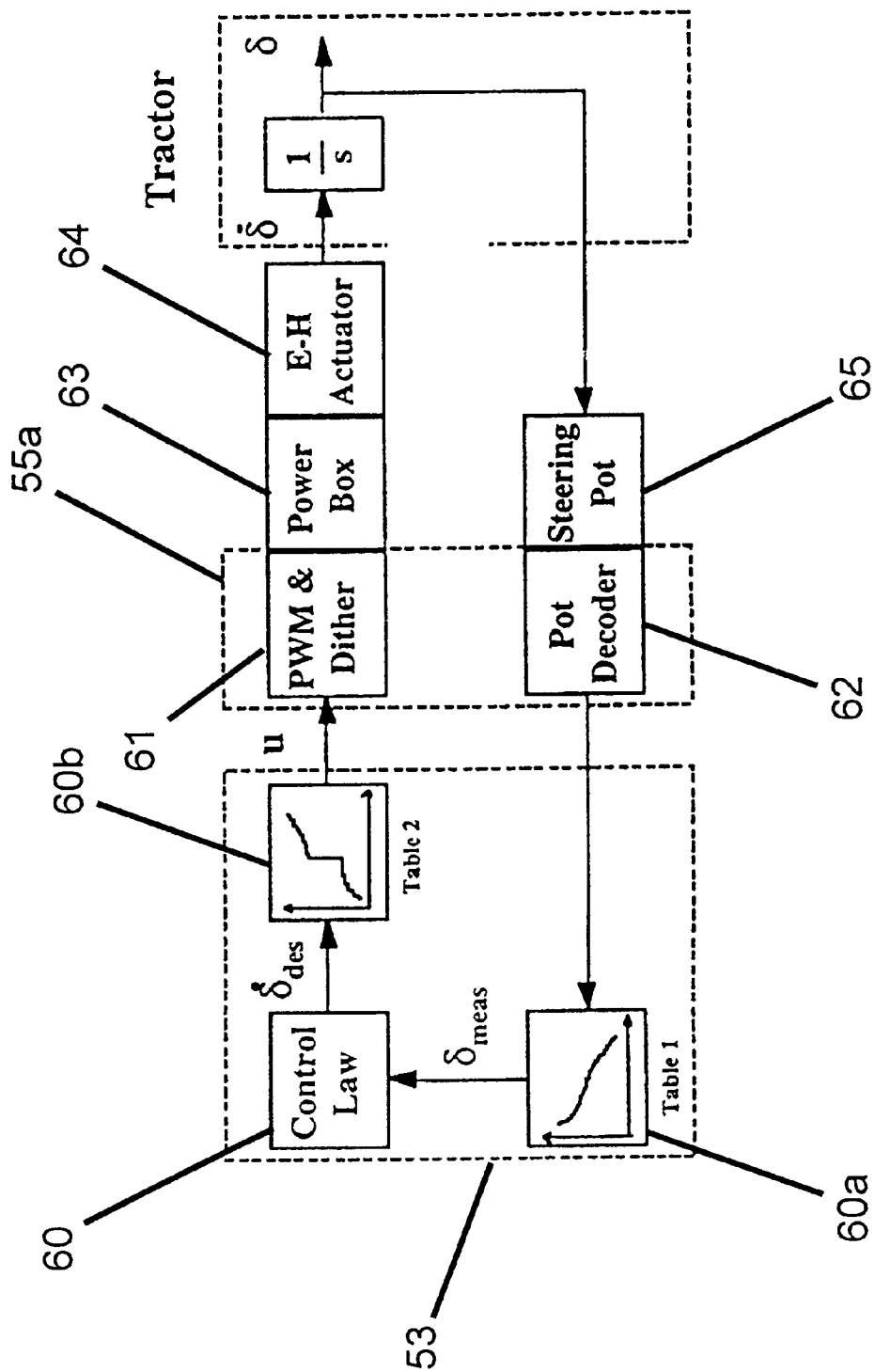
FIG. 6 is a block diagram of a controller and steering control components for the example of FIG. 5.

A first example is now described in reference to FIGS. 5 and 6. In this example, four single-frequency GPS antennas 50 were mounted on the top of the cab of a tractor, and an equipment rack installed inside the cab. Front-wheel angle was actuated using an electro-hydraulic steering valve 56 and measured using a steering angle potentiometer 57. In a prototype embodiment, the steering valve 56 and potentiometer 57 comprised a modified Orthman electro-hydraulic steering unit. Of course it will be understood that the invention is not so limited and that other equivalent structures could be utilized.

In this first example, a microprocessor board and power circuit 55 were also installed in the vehicle. In one prototype, a Motorola MC68HC11 microprocessor board was used to provide a communications interface between a computer 53 and the steering unit 56. The microprocessor 55 converted serial commands from the computer 53 into pulse width modulated signals which were then sent through the power circuitry to the steering motor 56. In this example, the microprocessor 55 was also used to sample the output from feedback potentiometer 57. In this particular example, the microprocessor provided eight bit wheel angle measurement to the computer 53 at 20 Hz through a serial link.

As shown in the block diagram in FIG. 5, the CDGPS-based system used for vehicle position and attitude determination was identical to the above-referenced Integrity Beacon Landing System (IBLS). Specifically, a four-antenna, six-channel receiver 51, (in this case a Trimble Vector receiver) produced attitude measurements at a frequency of 10 Hz. A single-antenna nine-channel Trimble TANS receiver 52 produced carrier- and code-phase measurements at 5 Hz which were then used to determine vehicle position. A computer 53, in this example, a Pentium-based PC running the LYNX-OS operating system, performed data collection, position determination and control signal calculation according to software routines stored in memory (not shown).

The computer 53 also received data from a ground reference station (such as generally described in reference to FIG. 2). In this first example, the ground reference station comprised a computer, a single-antenna nine channel Trimble TANS receiver (such as receiver 52) for generating carrier phase measurements, and a Trimble 4000ST receiver generating RTCM code differential corrections. These data were transmitted to the datalink antenna 44 using a radio modem.

In this example, calibration tests were used to create two software-based "look-up" tables 60a and 60b as illustrated in FIG. 6. The first look-up table 60a was used to linearize the output of the steering potentiometer 57 versus the effective front wheel-angle rate to the actual wheel-angle rate. The second look-up table 60b was used to linearize the steering angle rate dδ/dt with respect to varying levels of actuator authority u.

As shown in FIG. 6, in this example, the actuator authority value u was output to a PWM and dither control 61 of microprocessor board 55a. Those controls were connected to the power box 63 and the electro-hydraulic actuator 64, which in turn provide output δ to control the tractor steering mechanism. As shown, the resulting steering angle δ is detected with steering potentiometer 65 and potentiometer decoder 62. The detected value is linearized with look-up table 60a and the measured value $\delta_{meas}$ provided to controller 60.

In contrast to prior art techniques for CDGPS control of ground vehicles, this first example advantageously utilized a hybrid controller designed to provide a fast response to large desired heading step commands. A non-linear "bang—bang" control law 60 generated actuator commands when there are large errors or changes in the vehicle heading or effective wheel angle states. Typically, these large changes occur in response to a large heading step command. When the vehicle states were close to zero, a controller based on standard Linear Quadratic Regulator (LQR) design is used, as described below in reference to FIG. 7.

As generally known, "bang—bang" control is a standard non-linear control design tool based on phase-plane technique. Unlike linear feedback controllers, bang—bang controllers use the maximum actuator authority to zero out vehicle state errors in minimum time just as a human driver would. For example, in response to a commanded heading step increase of 90°, a bang—bang controller commands the steering wheel to hard right, holds this position, and then straightens the wheels in time to match the desired heading. In contrast, a linear controller responds to the step command by turning the wheels to hard right, then slowly bringing them back to straight, asymptotically approaching the desired heading. The drawback to bang—bang control is that when state errors are close to zero, the controller tends to "chatter" between hard left and hard right steering commands. For this reason, a linear controller was used for small deviations about the nominal conditions.

Figure 7:
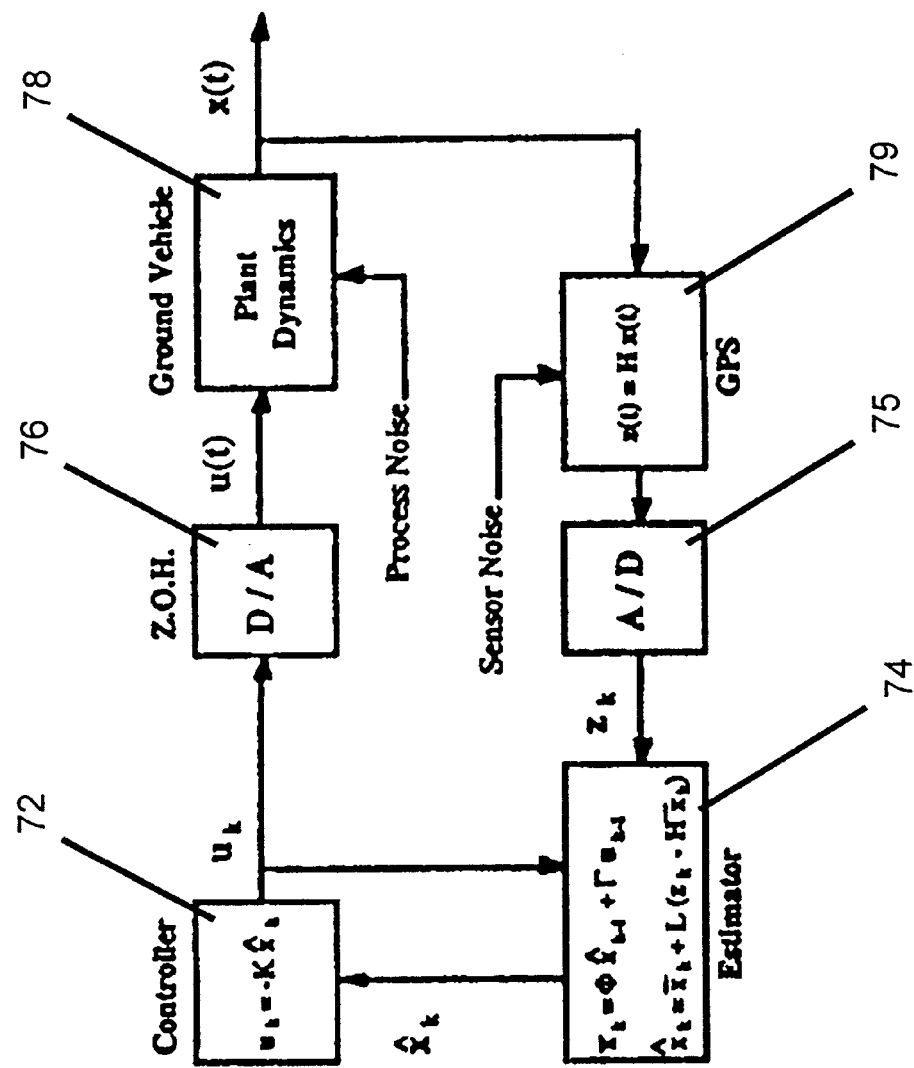
FIG. 7 is a block diagram of a controller based on a Linear Quadratic Guassian (LQG) design.

As shown in FIG. 7, this example advantageously utilized a discrete Linear Quadratic Regulator (LQR) and Estimator (LQE) for automatic control for small state changes. In this example, controller 72 calculates the control signal $u_k$ on the basis of control gains K and the estimated unit state of the vehicle $\hat{x}_k$. In this example, the control gains were chosen to minimize a quadratic cost function based on control inputs and state deviations from nominal. The control signal $u_k$ was fedback to the estimator 74 which calculates $\hat{x}_k$ using the equations shown in FIG. 7 on the basis of $u_k$ as well as the measurements, $z_k$. In turn $z_k$ is based on the function z(t) as measured and A/D converted at block 75. The control signal $u_k$ is converted to an analog signal at 76 to obtain function u(t). This signal is then used to steer the vehicle to follow a desired trajectory.

The full vehicle state may be appended to include the observable sensor biases ψ-bias and δ-bias for estimation purposes. In this particular example, the optimal estimator gains L were found using the assumed vehicle dynamic model and a model of disturbances based on experimental data.

Figure 8:
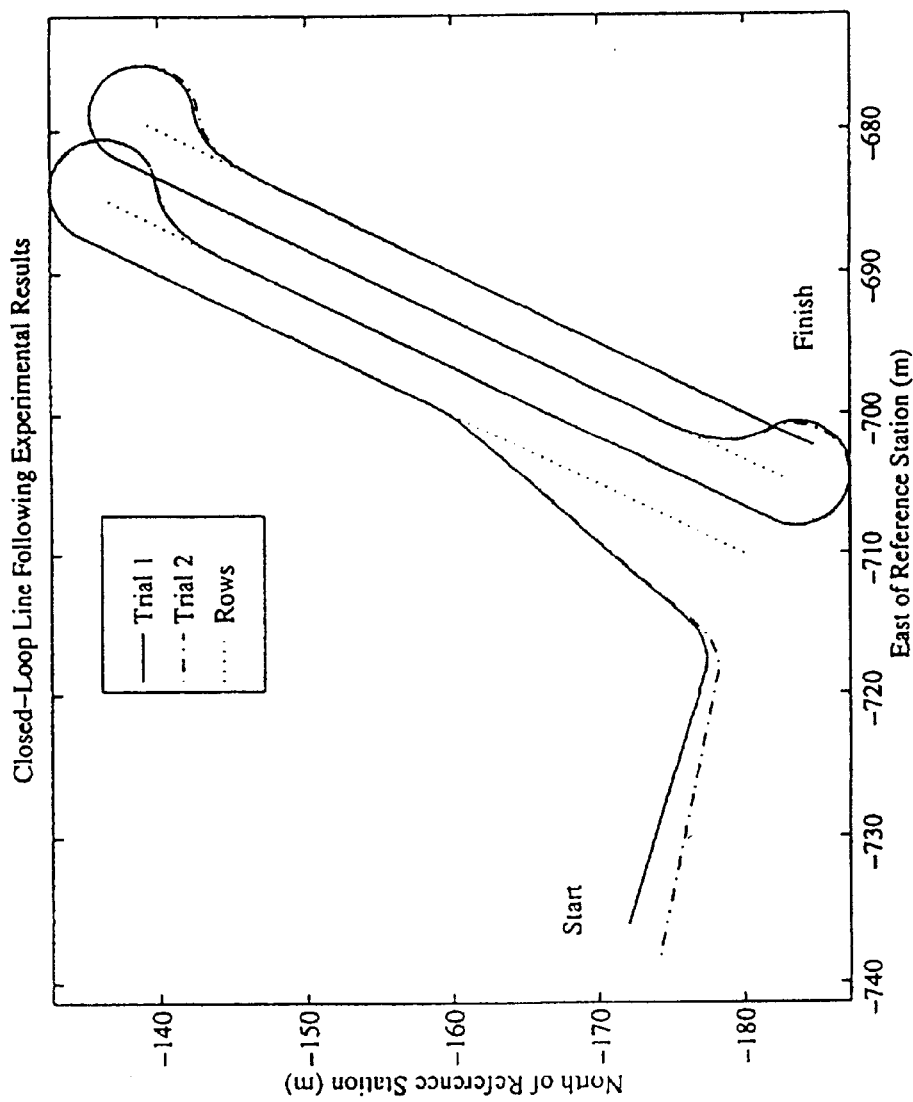
FIG. 8 is a graph showing the results of two closed-loop tracking test performed with the example of FIG. 5.

FIG. 8 shows the results of two closed-loop tracking tests performed with this first examplary system. To obtain these results, the vehicle forward velocity was manually set to first gear (0.33 m/s) and the tractor commanded to follow four parallel rows, each 50 meters long, separated by 3 meters. Throughout these tests, the steering control for line acquisition, line tracking, and U-turns was performed entirely by the control system. CDGPS integer cycle ambiguities were initialized by driving the tractor as closely as possible to a surveyed location and manually setting the position estimate. It should be noted that FIG. 8 shows CDGPS measurements taken during the two-tests, not actual vehicle position. In fact, there was a small, steady position bias (about 10 cm) between the two trials due to the above-described method for GPS carrier phase integer cycle ambiguity resolution. As described below, this bias may be eliminated by use of pseudolites. Notwithstanding this bias, these results demonstrate the use of the invention to control a vehicle on straight lines and u-turns.

In contrast to the foregoing example, in a preferred alternative embodiment of the invention, system parameters are calculated on-line as the vehicle is in operation. Such a technique is utilized in the embodiment shown generally in the FIG. 9.

Figure 9:
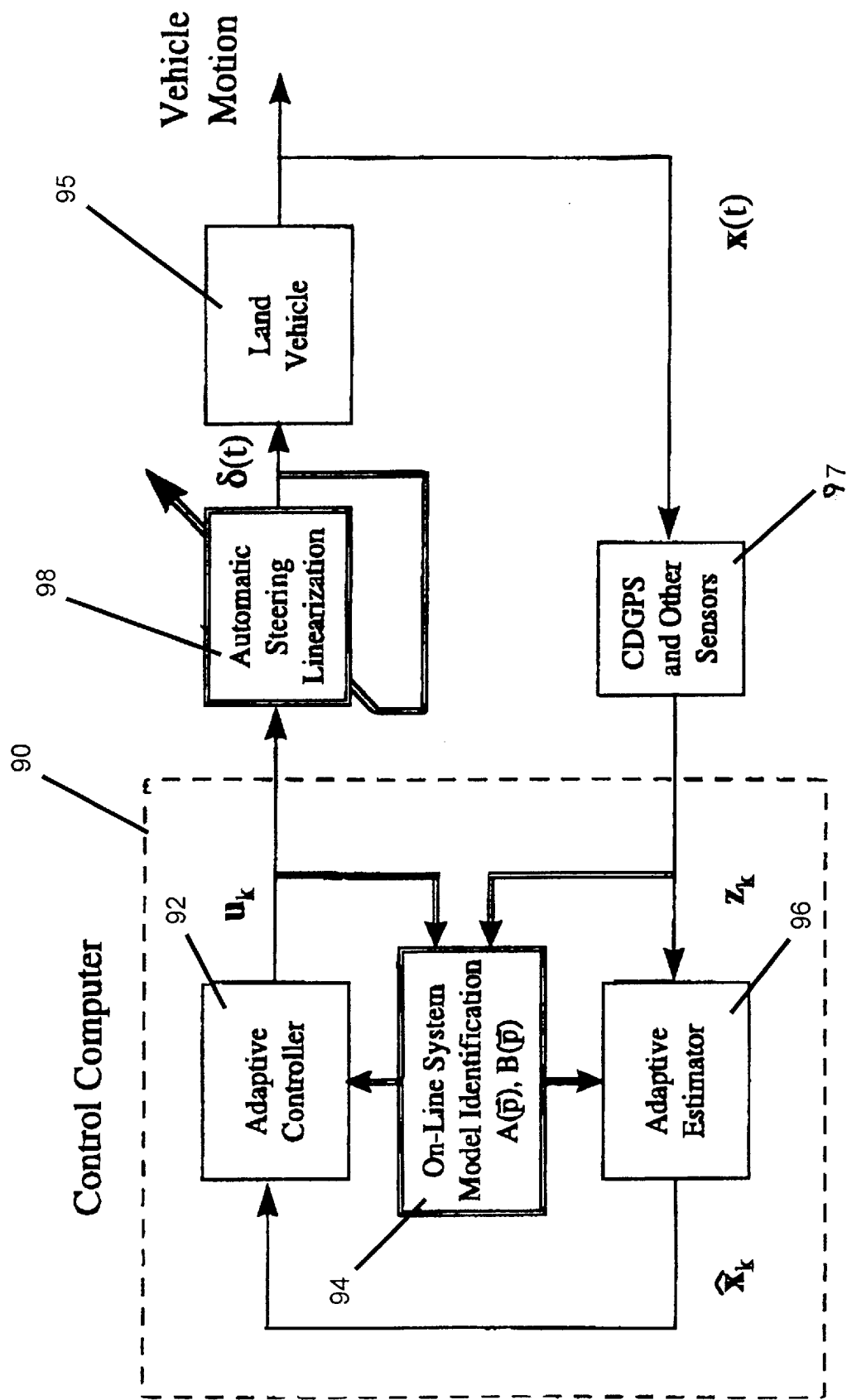
FIG. 9 is a block diagram showing a preferred embodiment of the invention which uses an adaptive controller and which identifies system parameters on-line.

As shown in FIG. 9, a control computer 90 is configured to perform various functions. The control computer 90 acquires data from CDGPS and other sensors 97 (which may include a wheel angle sensor as noted generally in FIG. 3). This data is representative of vector $z_k$, the discrete-time measurement vector, and x(t), the continuous time-state vector. This information is filtered using an adaptive estimator 96 in order to determine the unit vector $\hat{x}$ which is indicative of the state of the vehicle. The state estimate is provided to the adaptive controller 92 which calculates the value of a control signal u using the dynamic model referred to above which takes into accounts varying conditions as represented by parameter vector p. In this example, A(p) and B(p) are identified on-line as the vehicle is in operation, as generally shown at block 94. As the parameters A(p) and B(p) are updated, these values are provided to the adaptive estimator 96.

It will be understood that various techniques known in the art may be utilized to obtain $\hat{x}$ with adaptive estimator 96. For example, in prototype vehicles, we have shown that the Extended Kalman Filter (EKF) may be utilized. The formulae used for implementation of this technique are:

$$\dot{x} = f(x) + \Gamma u_k$$
$$\dot{P} = F(\hat{x}_k) + PF^T(\hat{x}_k) + Q$$
$$F = \frac{\partial}{\partial x} f(x)\bigg|_{x=\hat{x}}$$
$$\hat{x}_k^+ = \hat{x}_k^- + K_k(y_k - C\hat{x}_k^-)$$
$$P^+ = P^-(I - K_k C)P^-$$
$$K_k = P^- C^T [CP^- C^T + R]^{-1}$$

Alternatively parameter identification may be based on an adaptation of the Observer/Kalman Filter Identification (OKID) method. In contrast to the EKF method, OKID assumes no a priori information about the system dynamics. The details of this technique as applied to control of ground vehicles have been described previously by the present inventors in Elkaim et al., "System Identification of a Farm Vehicle Using Carrier-Phase Differential GPS," supra, the disclosure of which is incorporated by reference herein.

In general, given a linear discrete time state-space system, the equations of motion can be summarized as follows:

$$x_{k+1} = Ax_k + Bu_k$$

$$y_k = Cx_k + Du_k$$

The triplet [A,B,C] is not unique, but can be transformed through any similarity transform to another set of coordinates. However, the system response from rest when perturbed by a unit pulse input, known as the system Markov parameters, are invariant under similarity transforms. These Markov parameters are:

$$Y_0 = D, Y_1 = CB, Y_2 = CAB, \ldots, Y_k = CA^{K-1}B$$

When assembled into the generalized Hankel matrix, the Hankel matrix can be decomposed into the Observability matrix, a state transition matrix, and the Controllability matrix; the Hankel matrix (in a noise free case) will always have rank n, where n is the system order, as follows:

$$H(k-1) = \begin{bmatrix} Y_k & Y_{k+1} & \cdots & Y_{k+\beta-1} \\ Y_{k+1} & Y_{k+2} & \cdots & Y_{k+\beta} \\ \vdots & \vdots & \ddots & \vdots \\ Y_{k+\alpha-1} & Y_{k+\alpha} & \cdots & Y_{k+\alpha+\beta-1} \end{bmatrix}$$

$$H(k-1) = \begin{bmatrix} C \\ CA \\ CA^2 \\ \vdots \\ CA^{\alpha-1} \end{bmatrix} A^{k-1} [B \quad AB \quad A^2B \quad \cdots \quad A^{\beta-1}B]$$

Because noise will corrupt this rank deficiency of the Hankel matrix, the Hankel matrix is truncated by a singular value decomposition at an order that sufficiently describes the system. This truncated Hankel matrix is then used to reconstruct the triplet [A, B, C] and is referred to as the Eigensystem Realization Algorithm (ERA). A modified version of this algorithm that includes data correlation is used to identify the tractor, as known in the art.

For any real system, however, system pulse response cannot be obtained by simply perturbing the system with a pulse input. A pulse with enough power to excite all modes above the noise floor would likely saturate the actuator or respond in a non-linear fashion. The pulse response of the system can, however, be reconstructed from a continuous stream of rich system input and output behavior. Under normal circumstances, there are not enough equations available to solve for all of the Markov parameters. Were the system asymptotically stable, such that $A^k=0$ for some k, then the number of unknowns could be reduced. The identification process would be of little value if it could only work with asymptotically stable systems.

By adding an observer to the linear system equations, the following transformation can take place:

$$x_{k+1} = Ax_k + Bu_k + Gy_k - Gy_k \quad [\text{add zero}]$$

$$x_{k+1} = [A + GC]x_k + [B + GD]u_k - Gy_k$$

$$x_{k+1} = \hat{A}x_k + \hat{B}v_k$$

$$\hat{A} \equiv [A + GC], \hat{B} \equiv [B + GD - G], \text{ and } v_k \equiv \begin{bmatrix} u_k \\ y_k \end{bmatrix}$$

Thus, the system stability can be augmented through an observer, and the ideal Markov parameters established through a least-squares solution. (This solution may be established using methods known in the art; see, for example, J.-N. Juang, *Applied System Identification* 175–182 (Prentice Hall 1994).) It is useful to note that the realization also provides a pseudo-Kalman observer. The observer orthagonalizes the residuals to time-shifted versions of both input and output. This makes controller design a much simpler process. An improved version of the OKID process, which includes residual whitening, was used in a prototype example to identify the farm tractor from the experimental data.

Examples of the invention have now been described in which CDGPS is used to control a ground vehicle. It has been verified that these techniques permit position accuracy to within 1 cm and attitude accuracy to within 0.1° According to a preferred embodiment, parameter identification is performed on-line. This information is then used to adaptively control a ground vehicle.

It will be appreciated by those skilled in the art that the aforementioned examples require techniques for integer ambiguity resolution in order to accurately determine position and attitude utilizing CDGPS. As referred to above, initialization may be accomplished by running the vehicle along a surveyed position. However, this coarse method often introduces error. Another method is to maintain the vehicle in a stationary period during which the motion of the GPS satellites relative to the vehicle may be used for initialization. While accurate, this latter technique has the drawback of taking a prolonged amount of time (about 15 minutes). In another embodiment of the invention, these drawbacks (and others) are overcome by use of a single pseudolite or multiple pseudolites.

Preferred Embodiment Utilizing a Single Pseudolite

Figure 10:
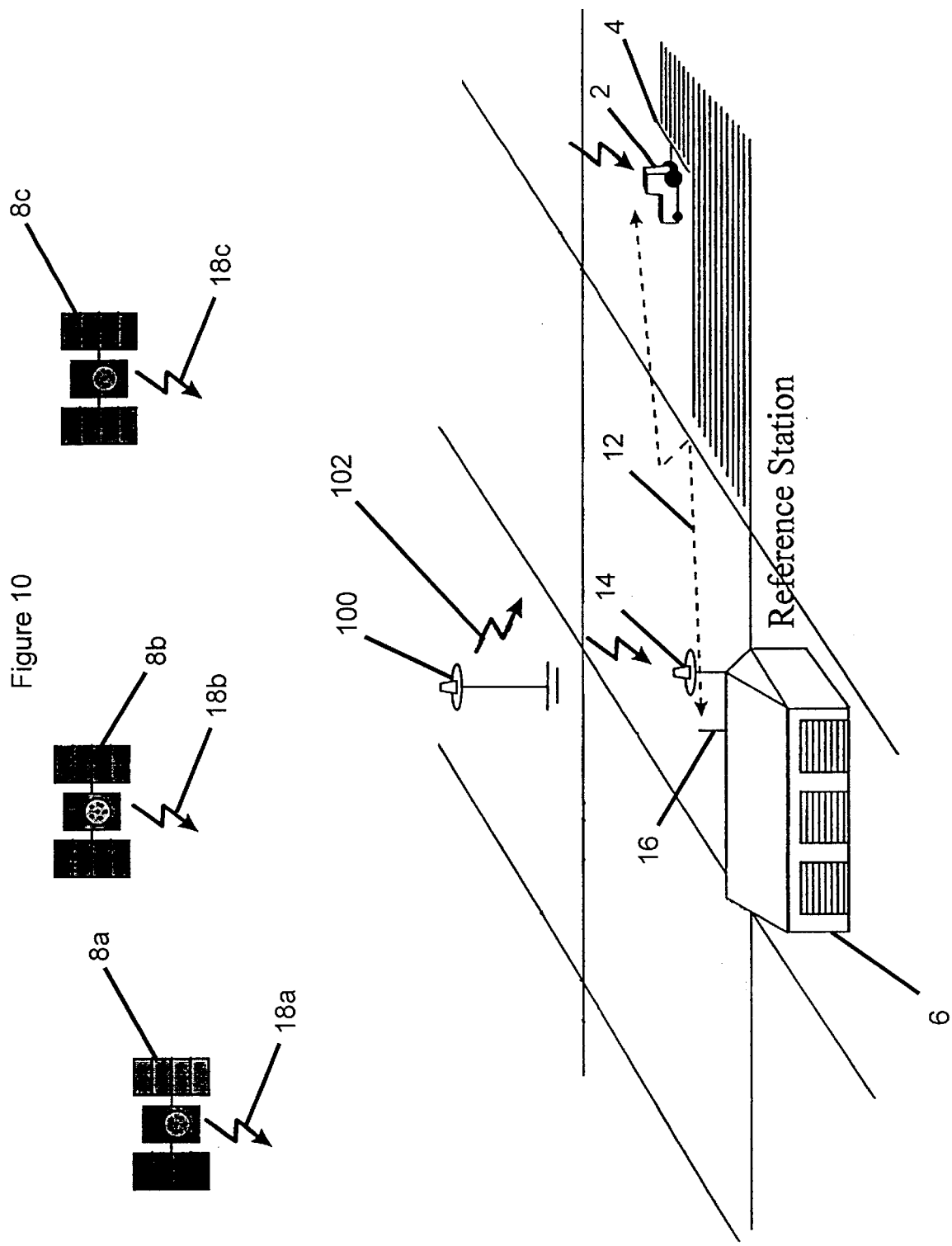
FIG. 10 is a general view of a GPS system according to a second embodiment of the present invention in which a single pseudolite is utilized.
Figure 11:
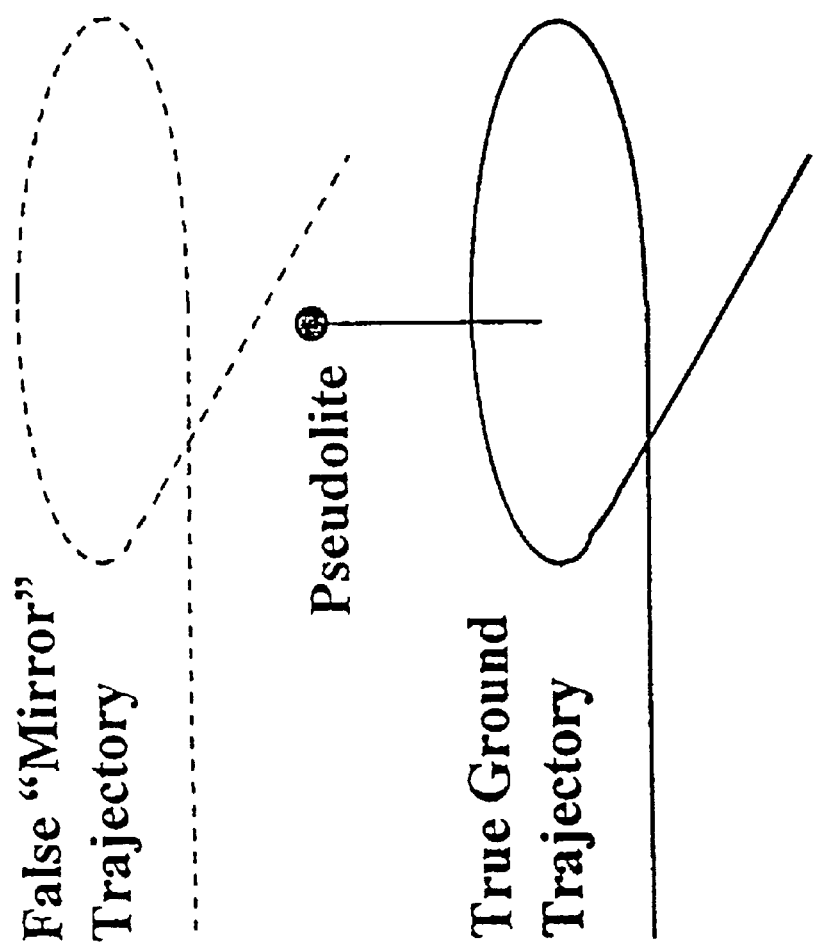
FIG. 11 is a diagram showing two identical planar trajectories an equal distance above and below a single pseudolite yielding the same pseudolite carrier phase measurements.

FIG. 10 is a diagram of a system according to an alternate embodiment of the present invention in which a single pseudolite is utilized for CDGPS initialization for guidance and control of a vehicle. As described below, this embodiment provides for rapid initialization. Moreover, it enhances system availability by permitting system operation even in the event that the signal from one of the minimum four GPS satellites is blocked or lost for some reason.

As described above in the embodiment described in FIG. 1, a vehicle 2 receives GPS signals 18a–18c from GPS satellites 8a–8c and correction signals from a reference station antenna 16. However, in contrast to the system illustrated in FIG. 1, the system shown in FIG. 10 includes a single pseudolite 100 which broadcasts a GPS signal 102 in the same format as the GPS satellites 8a–8c. Of course it will be understood additional pseudolites may be used in conjunction with this system. However, in contrast to prior art techniques, the present embodiment may utilize only one pseudolite for initialization.

In order to use a single pseudolite, the present invention collects and applies information concerning the relationship between vehicle path geometry and navigation system accuracy, the mathematics of incorporating a ground constraint into the carrier phase equations, and the benefits and difficulties of using either standard patch or dipole antennas. As demonstrated by the method and system of the present invention, an accurate solution to the carrier phase equation may be identified by moving the vehicle in the vicinity of one or more pseudolites, causing rapid changes in the line-of-sight unit vectors to these transmitters. With adequate pseudolite pass geometry, the position and integer estimate covariances become very small.

Unlike airplanes on final approach, most land vehicles using GPS have the freedom to execute a curved trajectory near a pseudolite. With an appropriate ground trajectory, it is possible to initialize a CDGPS system using a single pseudolite. A second navigation advantage land vehicles have over aircraft is two-dimensional motion. Since land vehicles are constrained to move on the ground, this information may be used to improve the accuracy, integrity, and non-linear convergence properties of the pseudolite solution.

Some noise is created on the vertical motion of a land vehicle during driving due to vehicle roll and pitch motion. For this reason, it is usually not realistic to impose a hard equality constraint on the vehicle position equations. If the ground near the pseudolite is fairly well modeled as a planar surface, the noise can be modeled as gaussian white noise. The following equation for a soft ground constraint can then be added at each epoch:

$$z = -e_{ground}^T x_k + \mu_k$$

where:

z=Ground plane distance from reference antenna $e_{ground}$=Ground unit normal vector (pointing up)

$\mu_k$=Ground noise with standard deviation $\sigma_z$

Figure 12:
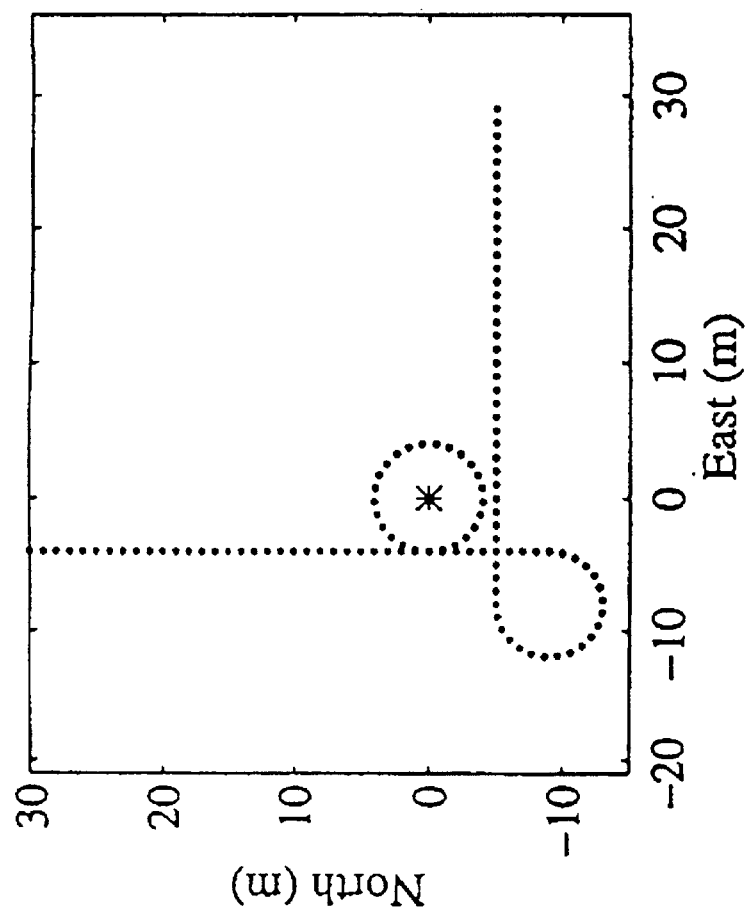
FIG. 12 is a graph of a 360° pseudolite pass trajectory.

If $\sigma_z$ is very small compared to $\sigma_\varphi$, the result mathematically approaches the solution obtained using a hard equality ground constraint. In practice, z, $e_{ground}$ and $\sigma_z$ can be found empirically by driving in the vicinity of the pseudolite carrier phase measurements. By applying symmetry to the non-linear equation above for two identical planar trajectories an equal distance above and below a single pseudolite, the result for each trajectory yield the same pseudolite carrier phase measurements, as shown in FIG. 12. The false "mirror" solution represents a local minimum for the non-linear convergence of the algorithm.

Care must be taken to ensure the algorithm does not converge to the "mirror" solution. When the ground constraint equation is used, even if the assumed ground noise ($\sigma_z$) is large compared to the carrier measurement noise ($\sigma_\varphi$), false convergence should be avoided. If the ground constraint equation is not used, some other logic must be added to ensure that the algorithm converges on the correct solution. For example, the vertical position of the vehicle may be mathematically constrained to lie below the pseudolite.

Figure 13:
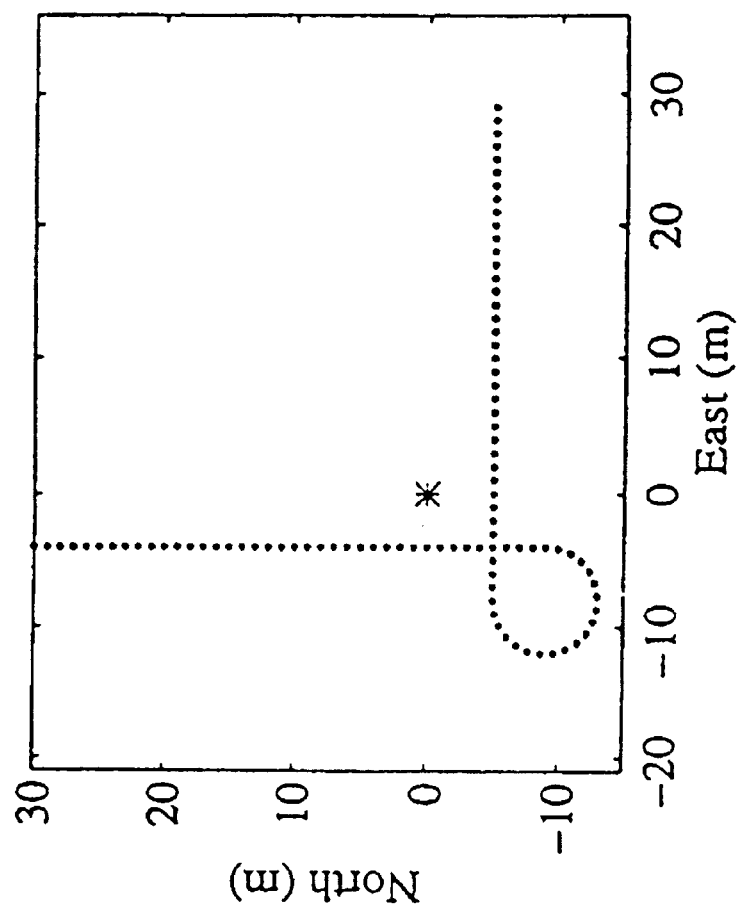
FIG. 13 is a graph of a 270° pseudolite pass trajectory.
Figure 14:
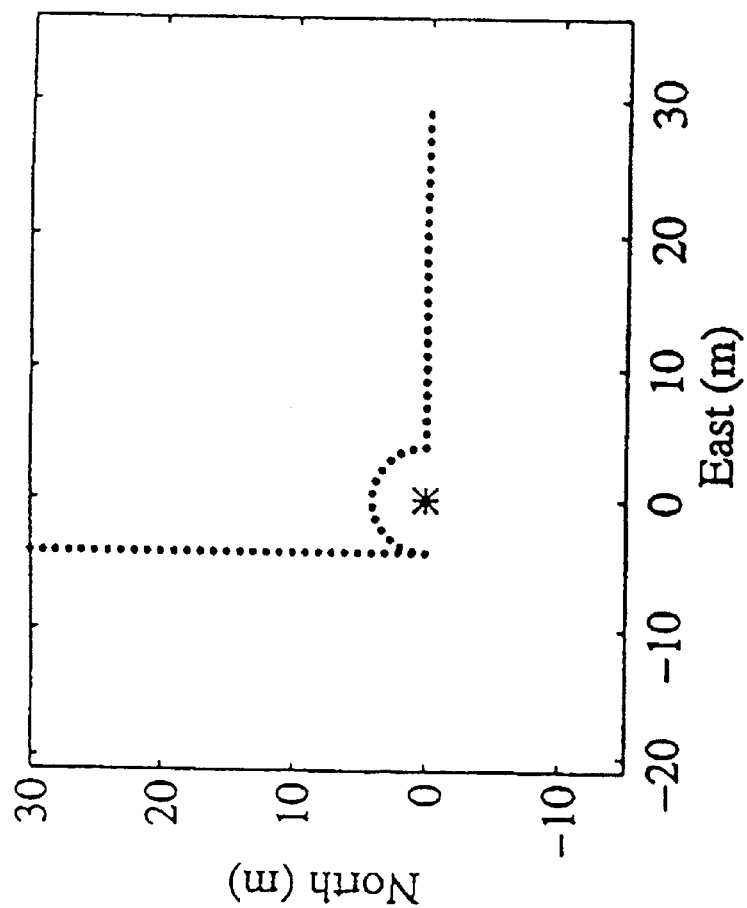
FIG. 14 is a graph of a 180° pseudolite pass trajectory.

Sample results using CDGPS initialization in a land vehicle with a single pseudolite were obtained for the following bubble pass trajectories: 1) full 360° motion around the pseudolite, as shown in FIG. 12; 2) 270° motion around the pseudolite, as shown in FIG. 13; and 3) 180° motion around the pseudolite, as shown in FIG. 14. These paths were chosen as examples to be fairly simple while still including large line-of-sight geometry change to the pseudolite.

The limits on motion around the pseudolite reflect possible real-world constraints such as physical obstructions or directional antenna patterns. For example, a pseudolite placed over the corner of a building would limit vehicle motion to 270°, while a patch antenna angled to face the ground would limit pseudolite reception to one side of the pseudolite.

Monte Carlo simulations were performed to determine the CDGPS position accuracy after a pseudolite pass. For each trajectory, 500 passes were performed. The ground constraint equation was not used, and each pass incorporated a new satellite geometry. A recent satellite almanac was used, and a 10° elevation mask was assumed. The minimum approach distance to a pseudolite in the simulations using these trajectories was 4 meters, and the altitude of the pseudolite was 2.25 meters. The simulations used gaussian white carrier phase measurement noise with a 1 centimeter standard deviation. The statistics of the results are shown in the table below:

|  | 360° Path | 270° Path | 180° Path |
| --- | --- | --- | --- |
| East (1-$\sigma$) | 0.84 cm | 0.86 cm | 1.24 cm |
| North (1-$\sigma$) | 1.12 cm | 1.14 cm | 1.77 cm |
| Up (1-$\sigma$) | 2.49 cm | 3.47 cm | 3.30 cm |

The results show that centimeter level accuracies are achievable by following these simple trajectories. As expected, the best performance is achieved by the 360° path. Constraining vehicle motion to 270° slightly degrades the vertical accuracy of the final solution but has little effect on the horizontal accuracy. The 180° path suffers an added degradation in horizontal performance, but the total horizontal error is still better than an inch (2.16 centimeters 1-$\sigma$).

Figure 15:
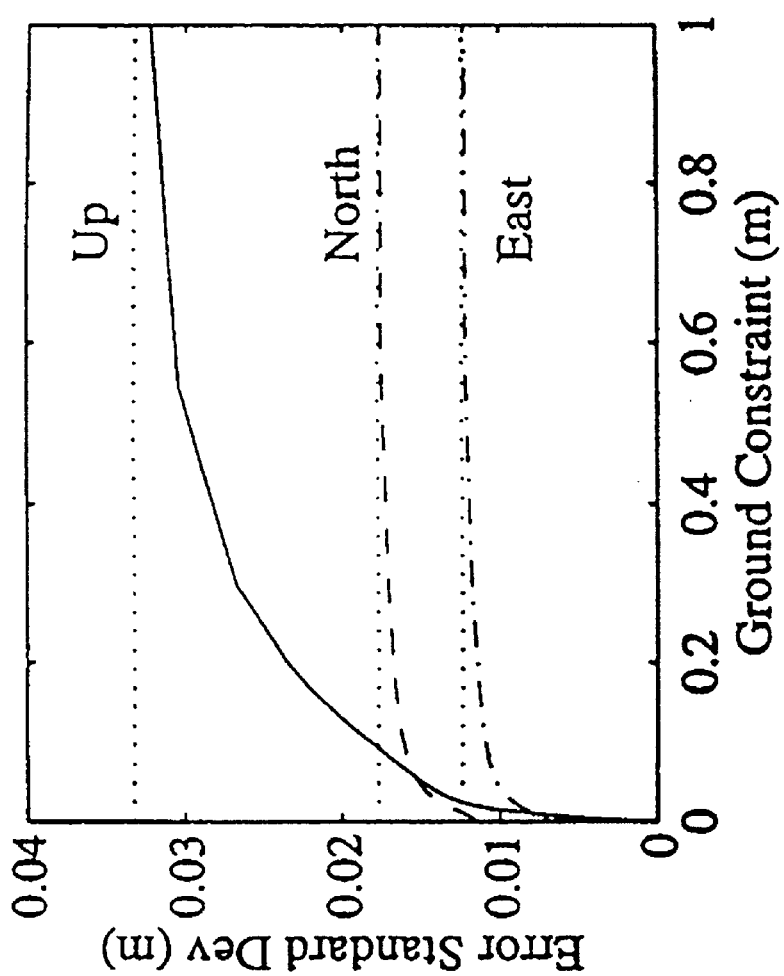
FIG. 15 is a diagram of the error standard deviation for the 180° path as a function of assumed ground noise.

These accuracies are reduced further by incorporating the ground constraint equation into the algorithm. FIG. 15 shows the error standard deviation for sample results for the 180° path as a function of assumed ground noise. As expected, when the ground noise approaches zero, the vertical error of the solution also approaches zero. An interesting result is that improving the vertical solution also improves the horizontal solution. As the ground noise approaches zero, the East and North errors are reduced by approximately 30%.

In one example of this embodiment, a standard patch antenna with no pre-amplifier was used as the pseudolite transmit antenna. The pseudolite antenna is located atop a tall aluminum pole with line-of-sight to the reference station and field. In a preferred embodiment, the antenna is angled 45 degrees toward the ground so the pseudolite signal may be better received by the vehicle.

Figure 16:
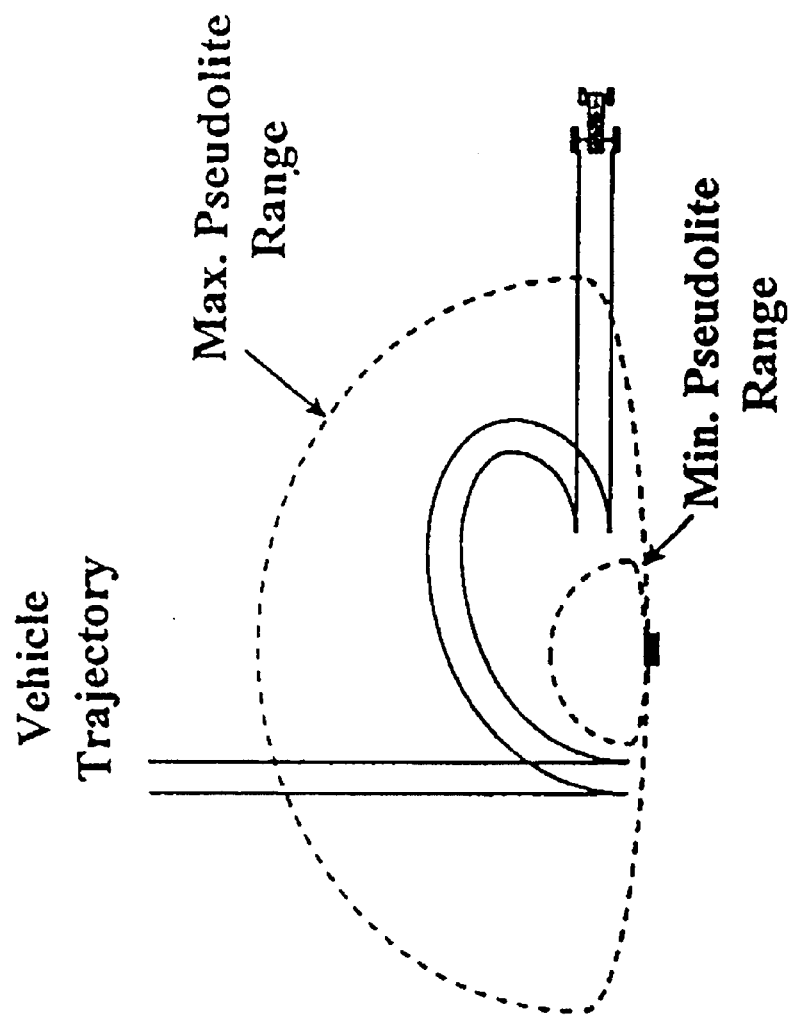
FIG. 16 is a graph of a basic trajectory used in a modified 180° pass.

In another example, a patch antenna was used for the pseudolite. To accommodate this type of antenna, a slight modification to the 180° pass described above was used in the example. FIG. 16 sketches the basic trajectory used in this example. To verify the accuracy of the pseudolite solution, a tractor was manually driven over a repeatable ground track after leaving the pseudolite signal area.

Figure 17:
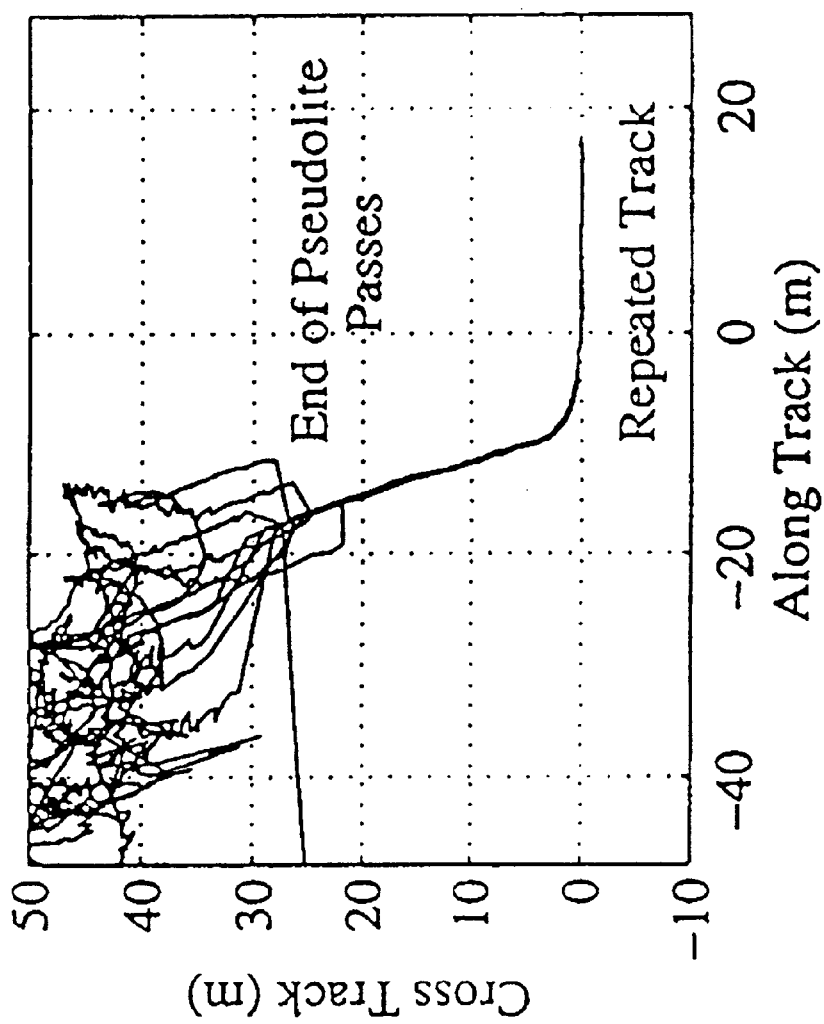
FIG. 17 is a diagram of the results for twelve successful pseudolite passes.

The results of twelve successful pseudolite passes are shown in FIG. 17. The sharp improvement in position accuracy is clearly seen as the tractor leaves the pseudolite signal region and the batch algorithm is executed. The high precision and repeatability are also evident from the low noise around the repeated track. On the repeated track, the overall horizontal noise, including driver error and path deviations, had a five centimeter standard deviation.

The ground constraint equation was not implemented in the real-time software for this example. As a result, the algorithm converged on the incorrect "mirror" solution described above for the five pseudolite passes. When these unsuccessful passes were examined in post-processing, all converged to the correct solution when the ground constraint equation was applied.

These results show that the vehicle motion during a bubble pass was not perfectly planar. Therefore, the mirror solution represents a local minimum in the vehicle position solution space, not a global minimum. Even if a ground constraint is not used, it may be possible to identify a mirror solution by its larger than expected residual. For all five cases examined in post-processing, the residual for the correct solution was better than the residual for the mirror solution.

A transmit antenna that can be received on the ground in all directions allows 270° to 360° pseudolite passes, which greatly improves the accuracy (and hence the integrity) of the system. A simple dipole or half-dipole antenna meets this requirement at low cost and reduced complexity. The vertical polarization of a dipole or half-dipole antenna also serves to reduce ground multipath of the pseudolite signal (see, for example, C. Bartone, Advanced Pseudolite for Dual-Use Precision Approach Applications, Proceedings of ION GPS-96, Kansas City, Mo., 95–105 (September 1996)).

Two major potential problems exist when using a simple pseudolite antenna, both of which are due to the fundamental differences in phase characteristics between a patch and a dipole. The first problem arises in surveying the location of the pseudolite. Data processing in existing survey equipment assumes two circularly polarized antennas are used in the survey. If a vertically polarized antenna were used, phase corrections would be required within the survey software.

Figure 18:
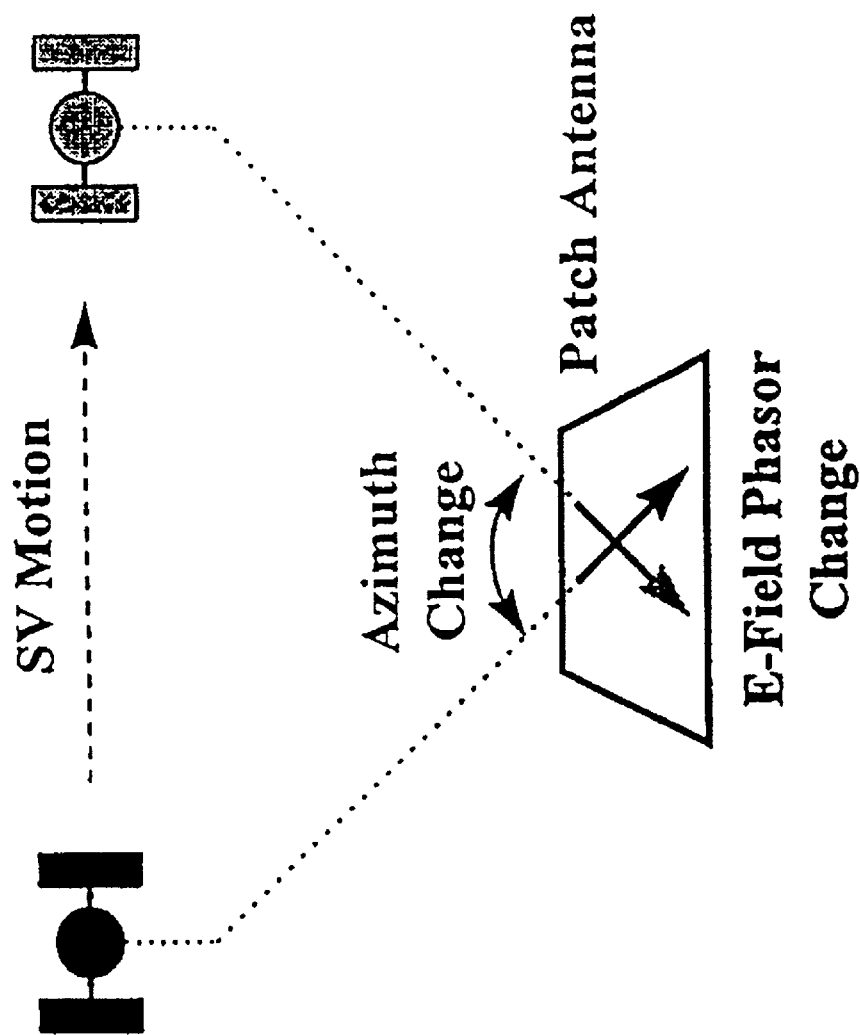
FIG. 18 is a diagram which illustrates the patch phase difference due to satellite azimuth motion.

The present invention applies a basic method of examining circular electromagnetic polarization corrections for CDGPS to a vertically polarized antenna receiving a circularly polarized wave. GPS satellite rotation about its boresight increases the carrier phase measured at a patch and a dipole antenna equally. The satellite elevation motion has no phase effect for either receive antenna (assuming the elevation does not perfectly coincide with the null of the dipole at 90°). A phase difference between the antennas is seen, however, when the GPS satellite moves in azimuth. By symmetry, a vertically polarized antenna will see no phase difference with satellite azimuth motion; however, a patch antenna will see a phase angle difference equal to the change in azimuth angle, as shown in FIG. 18.

Figure 19:
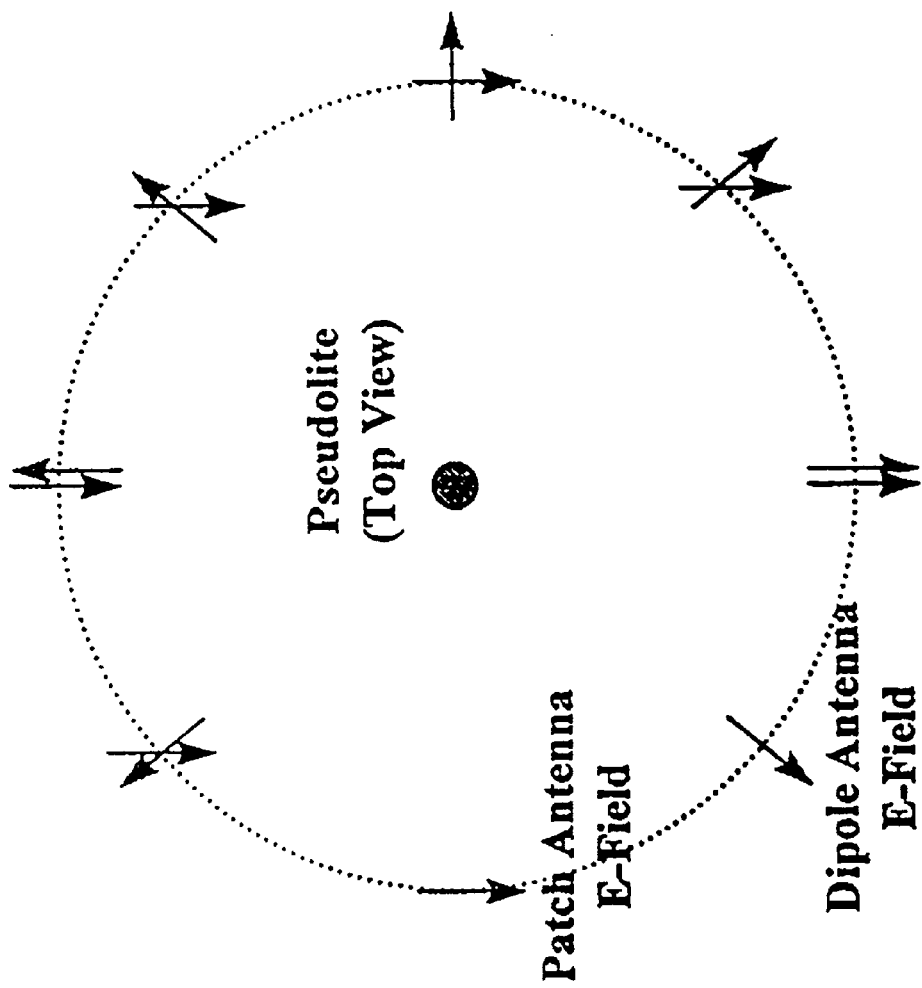
FIG. 19 shows the instantaneous horizontal E-field below a pseudolite for patch and dipole transmit antennas according to an embodiment of the present invention.

This survey problem may be solved by modifying the standard survey software to make this phase correction. This is a straightforward change since the azimuth angle to a GPS satellite is well known. Alternatively this problem may be solved by performing a pseudolite pass with the vehicle position already known to high accuracy. By reworking the nonlinear equation above and combining it with the fist two basic linearized carrier phase measurement equations, the pseudolite pass algorithm is easily modified to solve for the position of the pseudolite instead of the vehicle. Instead of the third basic linearized carrier phase measurement equation, the following linearized equation is used:

$$\delta\phi_{jk} = +\hat{e}_{jk}^T \delta p_j + \tau'_k + v_{jk},$$

j=1 ... n
where:
  $\delta p_j$=Linearized deviation in position for pseudolite j The second potential problem with using a dipole pseudolite antenna arises when receiving the vertically polarized signal through a patch antenna. It can be shown that rotating a vehicle receive antenna about its boresight has the same phase effect whether the pseudolite signal is of circular or linear polarization. It can also be shown that moving the receive antenna radially away from the pseudolite will have the same effect regardless of which transmit antenna is used. However, moving the receive antenna tangentially around a dipole pseudolite will produce an increase in phase that is not present with a patch pseudolite, as demonstrated in FIG. 19. This difference is equal to the change in azimuth angle around the pseudolite.

This second problem is readily solved by adding a phase correction term to the above equations which increases as the vehicle moves around the pseudolite.

The present invention thus provides a method and system for automatically controlling land vehicles based on carrier phase differential global positioning system information. The present invention also provides an improved method for initializing the positioning and control system using one or more pseudolites. An example of automatically controlled land vehicles using the present invention is control of farming tractors. These improvements represent significant improvements in accuracy, ease, and reduced costs of locating, guiding, and controlling vehicles over existing art.

Detailed examples of the invention have now been described in fulfillment of the above-mentioned objects. Many other features and modifications will be apparent to those skilled in the art without departing from the spirit and scope of the invention. It is therefore intended that the invention be limited only as described in the appended claims.

What is claimed is:

1. A system for controlling a ground vehicle using Carrier-Phase Differential GPS, comprising:
   a plurality of vehicle GPS antennas disposed fixedly to the vehicle to receive GPS signal;
   GPS receiver means coupled to the plurality of vehicle GPS antennas for producing vehicle attitude measurements and vehicle carrier- and code-phase measurements;
   vehicle steering control means for selectively changing the state of the vehicle;
   a ground reference station including at least one reference GPS antenna and GPS receiver means coupled thereto for producing reference phase carrier phase measurement and reference code differential corrections;
   means for providing a wireless communications channel between the reference station and the vehicle;
   means to calculate values defining the attitude of the vehicle based on phase differences received at the GPS antennas; and
   processing means including means for receiving as input data the vehicle attitude measurements, the vehicle carrier- and code phase measurements, the reference carrier phase measurements and reference code differential corrections, and controller means for calculating on the basis of the input data a control signal based on the deviation of the actual vehicle state from a desired vehicle state.

2. The system according to claim 1, wherein the processor means sequentially determines vehicle roll, pitch and yaw angles on the basis of phase differences in the GPS signals received respectively at the vehicle GPS antennas and adjusts the control signal to account for errors based on variations in vehicle roll, pitch and yaw to adjust measured orientation in a surface plane.

3. The system according to claim 2, wherein the vehicle GPS antennas comprise four antennas disposed at known locations relative to each other.

4. The system according to claim 1, further including sensor means for measuring actual steering angle and providing as input data wheel angle signal to the controller means.

5. The system according to claim 1, wherein the controller means calculates the control signal on the basis of a dynamic system model utilizing fixed system parameters obtained experimentally.

6. A method for controlling a ground vehicle using Carrier-Phase Differential GPS comprising the steps of:
   producing vehicle attitude measurements and vehicle carrier- and code-phase measurements with a GPS receiver on the basis of GPS signals received with a plurality of vehicle GPS antennas fixed to the vehicle at predetermined positions;
   producing reference carrier phase measurement and reference code differential correction using a ground reference station, the ground reference station including at least one reference GPS antenna and a GPS receiver coupled thereto;
   providing a wireless communication channel between the reference station and the vehicle;
   calculating values defining attitude of the vehicle using the phase differences of signals received at the GPS antennas, receiving as input data the vehicle attitude measurements, the vehicle carrier- and code phase measurements, the reference carrier phase measurements and reference code differential corrections;
   calculating on the basis of the input data a control signal based on the deviation of the actual vehicle state from a desired vehicle state; and
   selecting changing the state of the vehicle based on the control signal.

7. The method according to claim 6, wherein vehicle roll, pitch and yaw angles are calculated sequentially on the basis of phase differences in the GPS signals received respectively at the vehicle GPS antenna and the control signal is adjusted to account for errors based on variations in vehicle roll, pitch and yaw to adjust vehicle orientation in a surface plane.

8. The method according to claim 7, wherein the vehicle GPS antennas comprise four antennas.

9. The method according to claim 6, further including the step of measuring actual steering angle and providing as input data a wheel angle signal.

10. The method according to claim 6, wherein the control signal is calculated on the basis of a dynamic system model utilizing fixed system parameters obtained experimentally.

11. A system for controlling a ground vehicle using Carrier-Phase Differential GPS, comprising:
- a plurality of vehicle GPS antennas disposed fixedly to the vehicle to receive GPS signal;
- GPS receiver means coupled to the plurality of vehicle GPS antennas for producing vehicle attitude measurements and vehicle carrier- and code-phase measurements;
- vehicle steering control means for selectively changing the state of the vehicle;
- a ground reference station including at least one reference GPS antenna and GPS receiver means coupled thereto for producing reference phase carrier phase measurement and reference code differential corrections;
- means for providing a wireless communications channel between the reference station and the vehicle; and
- processing means including means for receiving as input data the vehicle attitude measurements, the vehicle carrier- and code phase measurements, the reference carrier phase measurements and reference code differential corrections, and controller means for calculating on the basis of the input data a control signal based on the deviation of the actual vehicle state from a desired vehicle state wherein the controller means dynamically recalculates vehicle state at successive measurement intervals.

12. The system according to claim 11, wherein the system parameters vary on the basis of varying conditions including: vehicle velocity, relative displacement between the vehicle GPS antennas and the wheel base of the vehicle, or soil conditions that contribute to vehicle wheel slippage.

13. A system for controlling a ground vehicle using Carrier-Phase Differential GPS, comprising:
- a plurality of vehicle GPS antennas disposed fixedly to the vehicle to receive GPS signal;
- GPS receiver means coupled to the plurality of vehicle GPS antennas for producing vehicle attitude measurements and vehicle carrier- and code-phase measurements;
- vehicle steering control means for selectively changing the state of the vehicle;
- a ground reference station including at least one reference GPS antenna and GPS receiver means coupled thereto for producing reference phase carrier phase measurement and reference code differential corrections;
- means for providing a wireless communications channel between the reference station and the vehicle; and
- processing means including means for receiving as input data the vehicle attitude measurements, the vehicle carrier- and code phase measurements, the reference carrier phase measurements and reference code differential corrections, and controller means for calculating on the basis of the input data a control signal based on the deviation of the actual vehicle state from a desired vehicle state, and means for initializing the system to obtain accurate vehicle position and attitude on the basis of the GPS signals.

14. The system according to claim 13, wherein the initializing means includes at least one GPS pseudolite, wherein the vehicle is initially moved around the GPS pseudolite to resolve ambiguities between one of the vehicle GPS antennas and the reference GPS antenna.

15. The system according to claim 14, wherein the initializing means includes only a single GPS pseudolite.

16. A system for controlling a ground vehicle using Carrier-Phase Differential GPS, comprising:
- a plurality of vehicle GPS antennas disposed fixedly to the vehicle to receive GPS signal;
- GPS receiver means coupled to the plurality of vehicle GPS antennas for producing vehicle attitude measurements and vehicle carrier- and code-phase measurements;
- vehicle steering control means for selectively changing the state of the vehicle including a first controller for relatively coarse steering adjustments and a second controller for relatively fine steering adjustment;
- a ground reference station including at least one reference GPS antenna and GPS receiver means coupled thereto for producing reference phase carrier phase measurement and reference code differential corrections;
- means for providing a wireless communications channel between the reference station and the vehicle; and
- processing means including means for receiving as input data the vehicle attitude measurements, the vehicle carrier- and code-phase measurements, the reference carrier phase measurements and reference code differential corrections, and controller means for calculating on the basis of the input data a control signal based on the deviation of the actual vehicle state from a desired vehicle state.

17. The system according to claim 16, wherein the first controller comprises a bang—bang controller.

18. The system according to claim 16, wherein the second controller comprises a Linear Quadratic Controller.

19. A method for controlling a ground vehicle using Carrier-Phase Differential GPS comprising the steps of:
- producing vehicle attitude measurements and vehicle carrier- and code-phase measurements with a GPS receiver on the basis of GPS signals received with a plurality of vehicle GPS antennas fixed to the vehicle at predetermined positions;
- producing reference carrier phase measurement and reference code differential corrections using a ground reference station, the ground station including at least one reference GPS antenna and a GPS receiver coupled thereto;
- providing a wireless communications channel between the reference station and the vehicle;
- receiving as input data the vehicle attitude measurements, the vehicle carrier- and code-phase measurements, the reference carrier phase measurements and reference code differential corrections;
- calculating on the basis of the input data a control signal based on the deviation of the actual vehicle state from a desired vehicle state;
- selectively changing the state of the vehicle based on the control signal; and adaptively identifying system parameters on the basis of the input data, wherein a system controller is dynamically recalculated at successive measurement intervals.

20. The method according to claim 19, wherein the system parameters vary on the basis of varying conditions including:

vehicle velocity, relative displacement between the vehicle GPS antennas and the wheel base of the vehicle, or soil conditions that contribute to vehicle wheel slippage.

21. The method according to claim 19, wherein the control signal is calculated on the basis of a dynamic system model utilizing fixed system parameters obtained experimentally.

22. The method according to claim 19, further including the step of initializing to obtain accurate vehicle position and attitude on the basis of the GPS signals.

23. The method according to claim 22, wherein the step of initializing is accomplished by moving the vehicle around at least one GPS pseudolite to resolve integer ambiguities between one of the vehicle antennas and the reference GPS antenna.

24. The method according to claim 23, wherein at least one GPS pseudolite consists of only a single GPS pseudolite.

25. The method according to claim 19, wherein the step of calculating includes using a first controller model for relatively coarse steering adjustments or a second controller model for relatively fine steering adjustment.

26. The method according to claim 25, wherein the first controller model comprises a bang—bang controller.

27. The method according to claim 26, wherein the second controller model comprises a Linear Quadratic Controller.

* * * * *